(12) United States Patent
Takashima et al.

(10) Patent No.: US 11,909,873 B2
(45) Date of Patent: Feb. 20, 2024

(54) DECRYPTION DEVICE, CRYPTOGRAPHIC SYSTEM, AND DECRYPTION METHOD

(71) Applicants: Mitsubishi Electric Corporation, Tokyo (JP); NIPPON TELEGRAPH AND TELEPHONE CORPORATION, Tokyo (JP)

(72) Inventors: Katsuyuki Takashima, Tokyo (JP); Tatsuaki Okamoto, Tokyo (JP); Pratish Datta, Tokyo (JP)

(73) Assignees: Mitsubishi Electric Corporation, Tokyo (JP); Nippon Telegraph and Telephone Corporation, Tokyo (JP)

( * ) Notice: Subject to any disclaimer, the term of this patent is extended or adjusted under 35 U.S.C. 154(b) by 271 days.

(21) Appl. No.: 17/207,087

(22) Filed: Mar. 19, 2021

(65) Prior Publication Data

US 2021/0234676 A1 Jul. 29, 2021

Related U.S. Application Data

(63) Continuation of application No. PCT/JP2019/031129, filed on Aug. 7, 2019.

(30) Foreign Application Priority Data

Oct. 4, 2018 (JP) ................................. 2018-188781

(51) Int. Cl.
*H04L 9/08* (2006.01)
*G06F 17/16* (2006.01)
*H04L 9/30* (2006.01)

(52) U.S. Cl.
CPC ............ *H04L 9/0861* (2013.01); *G06F 17/16* (2013.01); *H04L 9/0825* (2013.01); *H04L 9/3073* (2013.01)

(58) Field of Classification Search
None
See application file for complete search history.

(56) References Cited

FOREIGN PATENT DOCUMENTS

WO WO-2016132547 A1 * 8/2016 ......... G06F 21/6218

OTHER PUBLICATIONS

Kawai, "Master Key Updatable Attribute-Based Encryption on the Dual Pairing Vector Space", Mitsubishi Electric, 2016, pp. 1-5. (Year: 2016).*

(Continued)

*Primary Examiner* — Benjamin E Lanier
(74) *Attorney, Agent, or Firm* — Birch, Stewart, Kolasch & Birch, LLP

(57) ABSTRACT

An encryption device (20) generates a ciphertext by setting, in the ciphertext, one of a predicate vector of arithmetic branching programs (ABP) and an attribute vector over a basis B of the basis B and a basis B*, which are dual bases in dual vector spaces. A key generation device (30) generates a decryption key by setting, in the decryption key, the other one of the predicate vector and the attribute vector over the basis B*. A decryption device (40) decrypts the ciphertext by performing a pairing operation on the ciphertext generated by the encryption device (20) and the decryption key generated by the key generation device (30).

8 Claims, 15 Drawing Sheets

(56) References Cited

OTHER PUBLICATIONS

Okamoto, "Fully Secure Unbounded Inner-Product and Attribute-Based Encryption", Proceedings of the 18th 1-90international conference on The Theory and Application of Cryptology and Information Security, 2012, pp. 1-90. (Year: 2012).*
Datta et al., "Adaptively Simulation-Secure Attribute-Hiding Predicate Encryption", Cryptology ePrint Archive, Report 2018/1093, [online], Nov. 12, 2018, pp. 1-63, total 65 pages.
International Search Report for PCT/JP2019/031129 dated Oct. 21, 2019.
Ishai et al., "Partial Garbling Schemes and Their Applications", In: J. Esparza et al., (Eds.): ICALP 2014, Part I, Lncs 8572, total 23 pages.
Ishai et al., "Perfect Constant-Round Secure Computation via Perfect Randomizing Polynomials", In: International Colloquium on Automata, Languages and Programming, ICALP 2002, Springer (2002), pp. 244-256, total 17 pages.
Okamoto et al., "Adaptively Attribute-Hiding (Hierarchical) Inner Product Encryption", Cryptology ePrint Archive: Report 2011/543, http://eprint.iacr.org/2011/543, 2011, total 40 pages.
Wee, "Attribute-Hiding Predicate Encryption in Bilinear Groups, Revisited", In: Y. Kalai and L. Reyzin (Eds.): TCC 2017, Part I, LNCS, vol. 10677, Springer, Heidelberg, 2017, pp. 206-233, total 30 pages.

* cited by examiner

DECRYPTION DEVICE, CRYPTOGRAPHIC SYSTEM, AND DECRYPTION METHOD

CROSS REFERENCE TO RELATED APPLICATIONS

This application is a Continuation of PCT International Application No. PCT/JP2019/031129, filed on Aug. 7, 2019, which claims priority under 35 U.S.C. 119(a) to Patent Application No. 2018-188781, filed in Japan on Oct. 4, 2018, all of which are hereby expressly incorporated by reference into the present application.

TECHNICAL FIELD

The present invention relates to predicate encryption.

BACKGROUND ART

Non-Patent Literature 1 describes a predicate encryption scheme using predicates of arithmetic branching programs (ABP). This predicate encryption scheme is a scheme that allows a wide range of predicates.

CITATION LIST

Non-Patent Literature

Non-Patent Literature 1: Wee, H.: Attribute-hiding predicate encryption in bilinear groups, revisited. In: Theory of Cryptography Conference-TCC 2017. pp. 206-233. Springer (2017)

Non-Patent Literature 2: Ishai, Y, Kushilevitz, E.: Perfect constant-round secure computation via perfect randomizing polynomials. In: International Colloquium on Automata, Languages, and Programming-ICALP 2002. pp. 244-256. Springer (2002)

SUMMARY OF INVENTION

Technical Problem

The security of the predicate encryption scheme described in Non-Patent Literature 1 is not adaptive security that is practical. Therefore, there is concern about whether the security of this predicate encryption scheme is maintained when it is actually used.

It is an object of the present invention to make it possible to realize a predicate encryption scheme that allows a wide range of predicates as with the predicate encryption scheme described in Non-Patent Literature 1 and also allows security to be enhanced.

Solution to Problem

A decryption device according to the present invention includes a ciphertext acquisition unit to acquire a ciphertext in which one of a predicate vector of arithmetic branching programs (ABP) and an attribute vector is set over a basis B of the basis B and a basis B*, which are dual bases in dual vector spaces;

a decryption key acquisition unit to acquire a decryption key in which the other one of the predicate vector and the attribute vector is set over the basis B*; and a decryption unit to decrypt the ciphertext by performing a pairing operation on the ciphertext acquired by the ciphertext acquisition unit and the decryption key acquired by the decryption key acquisition unit.

Advantageous Effects of Invention

In the present invention, a ciphertext is decrypted by performing a pairing operation on the ciphertext in which one of a predicate vector of ABP and an attribute vector is set over a basis B and a decryption key in which the other one is set over a basis B*, the basis B and the basis B* being dual bases in dual vector spaces. This makes it possible to realize a predicate encryption scheme that allows a wide range of predicates and also allows security to be enhanced.

DESCRIPTION OF EMBODIMENTS

First Embodiment

*Notations*

Figure 1:
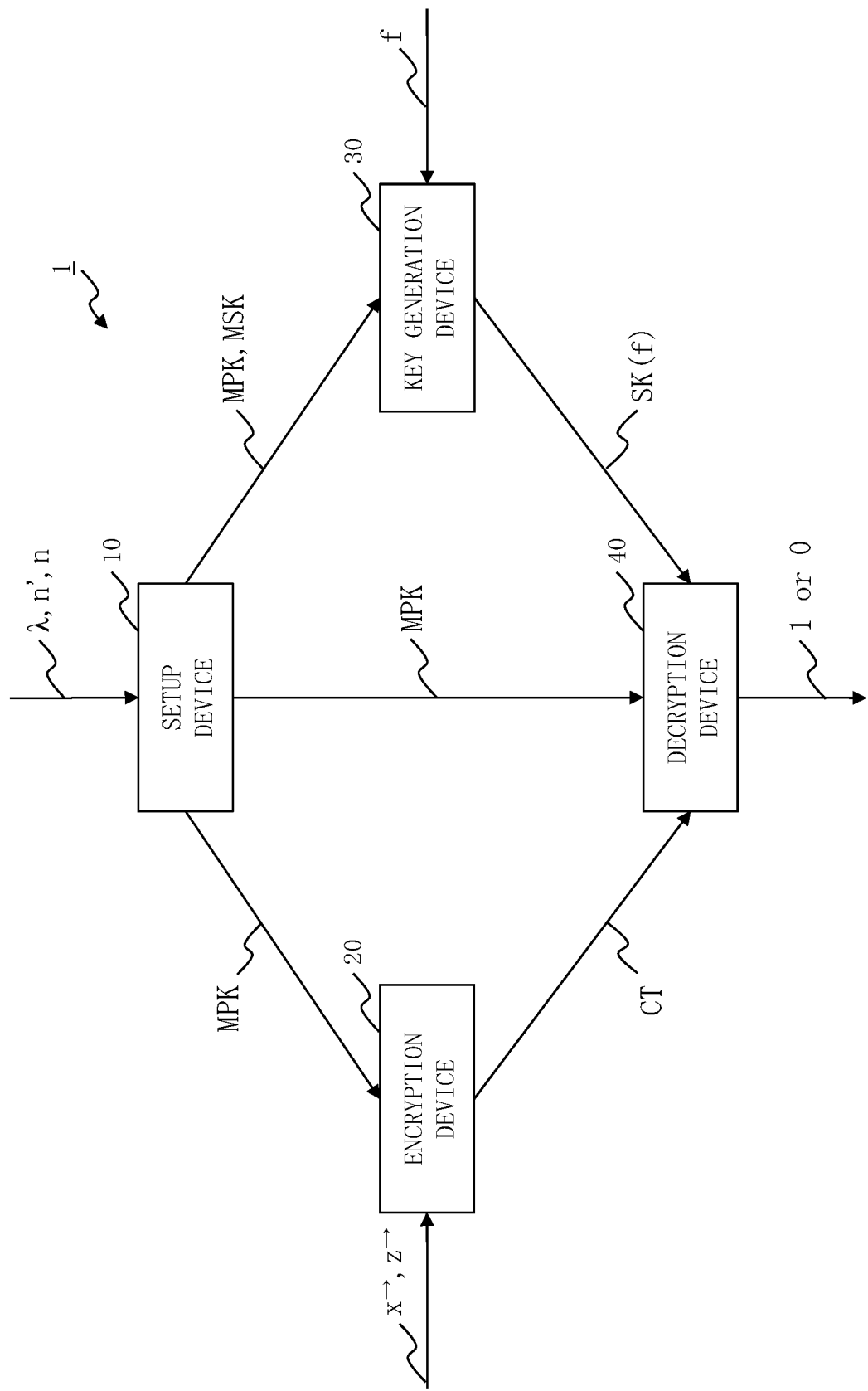
FIG. 1 is a configuration diagram of a cryptographic system 1 according to a first embodiment.

Notations to be used in the following description will be described.

Formula 101 denotes a security parameter, and $1^\lambda$ represents encoding of unary code.

$$\lambda \in \mathbb{N}$$ [Formula 101]

Formula 102 denotes a finite field modulo q. Formula 102 will be written as a field $F_q$ or simply as $F_q$.

$$\mathbb{F}_q \text{ for any prime } q \in \mathbb{N}$$ [Formula 102]

For Formula 103, Formula 104 is defined.

$$d \in \mathbb{N},$$

$$c \in \mathbb{N} \cup \{0\}(c<d)$$ [Formula 103]

$$[d]=\{1,\ldots,d\},$$

$$[c,d]=\{c,\ldots,d\}$$ [Formula 104]

Formula 105 denotes a process of uniformly sampling an element z from a set Z.

$$z \xleftarrow{U} Z$$ [Formula 105]

Z denotes the size or cardinality of the set Z.

For a probabilistic algorithm U, Π=U(Θ;Φ) denotes output of the algorithm U on input Θ with content Φ of a random tape. Formula 106 denotes a process of sampling Π from the output distribution of the algorithm U on input Θ with a uniform random tape.

$$\prod \xleftarrow{R} U(\Theta)$$ [Formula 106]

For a deterministic algorithm V, Π=V(Θ) denotes output of the algorithm V on input Θ.

It is assumed that each algorithm is given the unary representation $1^\lambda$ of the security parameter λ as input without any explicit indication of the input when it is clear from the context.

For Formula 107, Formula 108 denotes a vector indicated in Formula 109. Formula 108 will be written as $\vec{v}$.

$$\mathbb{F}_q^d$$ [Formula 107]

$$\vec{v}$$ [Formula 108]

$$(v_1, \ldots, v_d) \in \mathbb{F}_q^d$$

where $v_i \in \mathbb{F}_q$ for all $i \in d$ [Formula 109]

An all zero vector in a field $\mathbb{F}_q^d$ will be written as indicated in Formula 110.

$$\vec{0}^d$$ [Formula 110]

For two vectors indicated in Formula 111, Formula 112 denotes the inner product of the vector $\vec{v}$ and the vector $\vec{w}$. That is, Formula 112 denotes Formula 113.

$$\vec{v}, \vec{w} \in \mathbb{F}_q^d$$ [Formula 111]

$$\vec{v} \cdot \vec{w}$$ [Formula 112]

$$\vec{v} \cdot \vec{w} = \sum_{i \in [d]} v_i w_i \in \mathbb{F}_q$$ [Formula 113]

Formula 114 denotes a multiplicative cyclic group. Formula 114 will be written as a group G or simply as G.

$$\mathbb{G}$$ [Formula 114]

For the group G and a generator g of the group G, v denotes a d-dimensional vector of group elements. That is, this is expressed in Formula 115.

$$v = (g^{v_1}, \ldots, g^{v_d}) \in \mathbb{G}^d \text{ for some } d \in \mathbb{N},$$

where $\vec{v} = (v_1, \ldots, v_d) \in \mathbb{F}_q^d$ [Formula 115]

Formula 116 denotes a d-dimensional vector of group elements indicated in Formula 117. Formula 118 denotes an identity element of the group G.

$$\mathbb{G}^d$$ [Formula 116]

$$\underbrace{(1_\mathbb{G}, \ldots, 1_\mathbb{G})}_{d} \in \mathbb{G}^d$$ [Formula 117]

$$1_\mathbb{G}$$ [Formula 118]

$M=(m_{i,k})$ denotes a matrix with entries $m_{i,k} \in \mathbb{F}_q$. $M^T$ denotes a transpose of the matrix M. Note that det(M) denotes a determinant of the matrix M. In describing matrices, I denotes an identity matrix, and 0 denotes a zero matrix. $GL(d, \mathbb{F}_q)$ denotes a set of all d×d invertible matrices in $\mathbb{F}_q^{d \times d}$.

*Preliminaries*

Definitions of terms and the like to be used in the following description will be described.

In a first embodiment, a partially-hiding predicate encryption (PHPE) scheme using (ABP∘IP) predicates encompassing predicates of ABP and inner-product predicates will be described.

<PHPE>

PHPE is predicate encryption (PE) that partially conceals attributes. In the following description, an attribute vector $\vec{x}$ and an attribute vector $\vec{z}$ are given, and the attribute vector $\vec{x}$ is a public attribute vector to be published and the attribute vector $\vec{z}$ is a secret attribute vector to be kept secret.

<ABP>

A branching program (BP) Γ is defined by five elements indicated in Formula 119.

$$\Gamma = (V, E, V_0, V_1, \phi)$$ [Formula 119]

Formula 120 denotes a set of vertices, and Formula 121 denotes a set of edges. Formula 120 will be written simply as V, and Formula 121 will be written simply as E.

$$V$$ [Formula 120]

$$E$$ [Formula 121]

(V, E) is a directed acyclic graph. $V_0$ and $V_1 \in V$ are special vertices called a source and a sink respectively, and φ is a labeling function for edges in E.

An ABP Γ over a finite field $\mathbb{F}_q$ computes a function f indicated in Formula 122.

$$f: \mathbb{F}_q^d \to \mathbb{F}_q \text{ for some } d \in \mathbb{N}$$ [Formula 122]

Note that the labeling function φ assigned to each edge in E is a degree one polynomial function in one variable with coefficients in $\mathbb{F}_q$ or a constant in $\mathbb{F}_q$. Let p be a set of all paths from the source $V_0$ to the sink $V_1$ in the ABP Γ. The output of the function f computed by the ABP Γ on some input $\vec{v} = (v_1, \ldots, v_d) \in \mathbb{F}_q^d$ is defined as indicated in Formula 123.

$$f(\vec{v}) = \sum_{\mathbb{P} \in p} \left[ \prod_{E \in \mathbb{P}} \phi(E)|_{\vec{v}} \right]$$ [Formula 123]

Formula 124 denotes an evaluation value of a function φ(E) at $\vec{v}$.

$$E \in \mathbb{E}, \phi(E)|_{\vec{v}}$$ [Formula 124]

The following content is presented in Non-Patent Literature 2.

When ABP Γ=(V, E, $V_0$, $V_1$, φ) computing a function f is given, it is possible to efficiently and deterministically compute a function L mapping input $\vec{v} \in \mathbb{F}_q^d$ to a (#V−1)×(#V−1) matrix L($\vec{v}$) over $\mathbb{F}_q$. The following (1) to (3) hold:

(1) det(L($\vec{v}$))=f($\vec{v}$).

(2) Each entry of (L($\vec{v}$)) is a degree one polynomial function in one variable $v_i$ (i∈[d]) with coefficients in $\mathbb{F}_q$ or a constant in $\mathbb{F}_q$.

(3) (L($\vec{v}$)) contains only −1's in the second diagonal, that is, the diagonal just below the main diagonal, and contains only 0's below the second diagonal.

Specifically, the matrix L is obtained by removing the column corresponding to $V_0$ and the row corresponding to $V_1$ from a matrix $A_\Gamma - I$, where the matrix $A_\Gamma$ is an adjacency matrix for $\Gamma$ and I is an identity matrix.

Note that there exists a linear-time algorithm that converts any Boolean formula, Boolean branching program, or arithmetic formula to an ABP.

<Function Family $F^{(q,n',m)}_{ABP \circ IP}$>

A function family $F^{(q,n',m)}_{ABP \circ IP}$ is a function family supported by the PHPE scheme according to the first embodiment.

The function family $F^{(q,n',m)}_{ABP \circ IP}$ is parameterized by a prime q and natural numbers n' and n, and contains a function f indicated in Formula 125.

$$f: \mathbb{F}_q^{n'} \times \mathbb{F}_q^n \to \mathbb{F}_q \qquad \text{[Formula 125]}$$

defined by $$f(\vec{x}, \vec{z}) = \sum_{j \in [n]} f_j(\vec{x}) z_j$$

for all $\vec{x} = (x_1, \ldots, x_{n'}) \in \mathbb{F}_q^{n'}, \vec{z} = (z_1, \ldots, z_n) \in \mathbb{F}_q^n$ where $f_1, \ldots, f_n : \mathbb{F}_q^{n'} \to \mathbb{F}_q$ are functions computed by some ABP's $\Gamma_1, \ldots, \Gamma_n$ The function f is $\zeta f(\vec{x}, \zeta \vec{z}) = \zeta f(\vec{x}, \vec{z})$ for $\in \mathbb{F}_q$ and $(\vec{x}, \vec{z}) \in \mathbb{F}_q^{n'} \times \mathbb{F}_q^n$.

The function f realized by the ABP $\Gamma$ is constructed as described below.

First, all the source vertices of ABP $\{\Gamma_j\}_{j \in [n]}$ are merged into a single vertex, and the merged single vertex is designated as the source vertex of the ABP $\Gamma$. Next, a new sink vertex for the ABP $\Gamma$ is generated. For each integer j of $j \in [n]$, the sink vertex of the ABP $\Gamma_j$ is connected to the new sink vertex with a directed edge labeled with $z_j$. Note that the size of the ABP $\Gamma$ computing the function f is m+n+1, where 1 corresponds to the sink vertex of the ABP $\Gamma$, n corresponds to the number of edges directed to the sink vertex, and m corresponds to other vertices in the ABP $\Gamma$.

The ABP F is modified to an ABP $\Gamma'$ in which each vertex has only one outgoing edge having a label of degree one. Specifically, the ABP $\Gamma$ is modified to the ABP $\Gamma'$ by replacing each edge E in the ABP $\Gamma$ with a pair of edges labeled 1 and $\varphi(E)$, where $\varphi$ is the labeling function of the ABP $\Gamma$. The size of the ABP $\Gamma'$ is also m+n+1.

<ABP∘IP Predicate>

An ABP∘IP predicate family $R^{ABP \circ IP}$ is as indicated in Formula 126.

$$R^{ABP \circ IP} = \left\{ R^{ABP \circ IP}(f, (\cdot, \cdot)) : \mathbb{F}_q^{n'} \times \mathbb{F}_q^n \to \{0, 1\} \middle| f \in F^{(q,n',n)}_{ABP \circ IP} \right\} \qquad \text{[Formula 126]}$$

where $R^{ABP \circ IP}(f, (\vec{x}, \vec{z})) = 1$, if $f(\vec{x}, \vec{z}) = 0$, and $R^{ABP \circ IP}(f, (\vec{x}, \vec{z})) = 0$, if $f(\vec{x}, \vec{z}) \neq 0$, for all $f \in F^{(q,n',n)}_{ABP \circ IP}$ and $(\vec{x}, \vec{z}) \in \mathbb{F}_q^{n'} \times \mathbb{F}_q^n$ That is, if 0 is obtained when the vector $\vec{x}$ and the vector $\vec{z}$ are input to the function f, the ABP∘IP predicate family $R^{ABP \circ IP}$ outputs 1 when the function f, the vector $\vec{x}$, and the vector $\vec{z}$ are input. If 0 is not obtained when the vector $\vec{x}$ and the vector $\vec{z}$ are input to the function f, the ABP∘IP predicate family $R^{ABP \circ IP}$ outputs 0 when the function f, the vector $\vec{x}$, and the vector $\vec{z}$ are input.

<Partial GarBlig (PGB) Algorithm>

A PGB algorithm (PGB(f; $\vec{r}$)) is a probabilistic polynomial-time algorithm that takes as input a function $f \in F^{(q,n',n)}_{ABP \circ IP}$ and uses randomness $\vec{r} \in \mathbb{F}_q^{m+n-1}$ and outputs a set of constants $(\{\sigma_j\}_{j \in [n]}, \{\alpha_j, \gamma_j\}_{j' \in [m]}) \in \mathbb{F}_q^n \times (\mathbb{F}_q^2)^m$ along with a function $\rho: [m] \to [n']$. Together with $\vec{x} \in \mathbb{F}_q^{n'}$ and $\vec{z} \in \mathbb{F}_q^n$, these constants specify n+m shares $(\{z_j + \sigma_j\}_{j \in [n]}, \{\alpha_j \cdot z_{\rho(j')} + \gamma_j\}_{j' \in [m]})$.

Note that m+n+1 is the number of vertices in the ABP computing the function f and $\rho$ is deterministically derived from the function f.

The PGB algorithm has the following properties (1) to (3):

(1) Linearity: For a fixed function $f \in F^{(q,n',n)}_{ABP \circ IP}$, PGB(f;•) computes a linear function with randomness over $\mathbb{F}_q$.

(2) Reconstruction: There exists a deterministic polynomial-time algorithm REC that takes as input a function $f \in F^{(q,n',n)}_{ABP \circ IP}$ and $\vec{x} \in \mathbb{F}_q^{n'}$, and outputs a set of coefficients $(\{\Omega_j\}_{j \in [n]}, \{\Omega'_{j'}\}_{j' \in [m]}) \in \mathbb{F}_q^n \times \mathbb{F}_q^{n'}$. The set of coefficients is used in combination with a set of shares computed by combining the output of PGB(f) with $\vec{x}$ and $\vec{z} \in \mathbb{F}_q^n$, to recover $f(\vec{x}, \vec{z})$.

(3) Privacy: There exists a probabilistic polynomial-time algorithm SIM such that for any function $f \in F^{(q,n',n)}_{ABP \circ IP}$, $\vec{x} \in \mathbb{F}_q^{n'}$, and $\vec{z} \in \mathbb{F}_q^n$, the output of SIM on input of the function f, $\vec{x}$, and $f(\vec{x}, \vec{z})$ is identically distributed to shares. The shares are computed by combining the output of PGB(f; $\vec{r}$), for uniformly random $\vec{r}$, with $\vec{x}$ and $\vec{z}$.

<Bilinear Group>

Note that $param_G$, which is a bilinear group, indicated in Formula 127 includes a prime q, cyclic multiplicative groups $G_1$, $G_2$, and $G_T$ of order q, a generator $g_1$ of the group $G_1$, a generator $g_2$ of the group $G_2$, and a bilinear map e indicated in Formula 128.

$$\text{param}_G = (q, G_1, G_2, G_T, g_1, g_2, e) \qquad \text{[Formula 127]}$$

$$G_1, G_2, G_T \qquad \text{[Formula 128]}$$

The bilinear map e has the following two properties of bilinearity and non-degeneracy:

(Bilinearity)

Formula 129 holds.

$$e(g_1^\delta, g_2^{\tilde\delta}) = e(g_1, g_2)^{\delta\tilde\delta} \text{ for all } \delta, \tilde\delta \in \mathbb{F}_q \qquad \text{[Formula 129]}$$

(Non-Degeneracy)

Formula 130 holds. Note that Formula 131 denotes an identity element of the group $G_T$.

$$e(g_1, g_2) \neq \mathbb{1}_{G_T} \qquad \text{[Formula 130]}$$

$$\mathbb{1}_{G_T} \qquad \text{[Formula 131]}$$

In the following description, let $G_{BPG}()$ be a bilinear group generation algorithm. That is, $G_{BPG}$ is an algorithm that generates $param_G$.

<Dual Pairing Vector Spaces (hereinafter, DPVS)>

Note that $param_V$, which is DPVS, indicated in Formula 132 is formed by the direct product of $param_G$, which is a bilinear group, and $param_V$ includes a prime q, a d-dimensional vector space $V_t = G_t^d$ over $\mathbb{F}_q$, for $t \in [2]$, under vector addition and scalar multiplication defined for each element, a canonical basis $A_t$ of the vector space $V_t$, for $t \in [2]$, indicated in Formula 133, and a pairing operation e indicated in Formula 134.

$$\text{param}_\mathbb{V} = (\mathbb{V}, \mathbb{V}, \mathbb{G}_T, \mathbb{A}, \mathbb{A}, 2, e)$$

$$\mathbb{A}_t = \left\{ a^{(t,L)} = \left( \overbrace{1_{\mathbb{G}_t}, \ldots, 1_{\mathbb{G}_t}}^{L-1}, g_t, \overbrace{1_{\mathbb{G}_t}, \ldots, 1_{\mathbb{G}_t}}^{d-L} \right) \right\}_{L \in [d]} \quad \text{[Formula 133]}$$

$$e : \mathbb{V}_1 \times \mathbb{V}_2 \to \mathbb{G}_T \quad \text{[Formula 134]}$$

defined by $e(v, w) = \prod_{L \in [d]} e(g_1^{v_L}, g_2^{w_L}) \in \mathbb{G}_T$ for all $v = (g_1^{v_1}, \ldots, g_1^{v_d}) \in \mathbb{V}_1, w = (g_2^{w_1}, \ldots, g_2^{w_d}) \in \mathbb{V}_2$ The map e in param$_\mathbb{V}$ has the following two properties of bilinearity and non-degeneracy:
(Bilinearity)
Formula 135 holds.

$$e(\delta v, \hat{\delta} w) = e(v, w)^{\delta \hat{\delta}} \text{ for all } \delta, \hat{\delta} \in \mathbb{F}_q, v \in \mathbb{V}_1, w \in \mathbb{V}_2 \quad \text{[Formula 135]}$$

(Non-Degeneracy)
Formula 136 holds.

$$\text{If } e(v, w) = \mathbb{G} \text{ for all } w \in \mathbb{V}_2, \text{ then } v = \mathbb{G}_1^d \quad \text{[Formula 136]}$$

For a basis w of the vector space $V_t$ indicated in Formula 137 and a vector $\vec{v} \in \mathbb{F}_q^d$, Formula 138 denotes a vector of the vector space $V_t$ formed by a linear combination of the elements of the basis W and the elements of the vector $\vec{v}$. That is, Formula 138 denotes Formula 139.

$$\mathbb{W} = \{w^{(1)}, \ldots, w^{(d)}\} \text{ of } \mathbb{V}_t \text{ for } t \in [2] \quad \text{[Formula 137]}$$

$$(\vec{v})_\mathbb{W} \quad \text{[Formula 138]}$$

$$(\vec{v})_\mathbb{W} = \sum_{L \in [d]} v_L w^{(L)} \in \mathbb{V}_t \quad \text{[Formula 139]}$$

For a vector $v \in V_t$ and a matrix $M = (m_{i,k}) \in \mathbb{F}_q^{d \times d}$, vM denotes a d-dimensional vector indicated in Formula 140.

$$\left( g_t^{\sum_{i \in [d]} m_{i,1} v_i}, \ldots, g_t^{\sum_{i \in [d]} m_{i,j} v_i} \right) \in \mathbb{V}_t \quad \text{[Formula 140]}$$

In the following description, let $G_{DPVS}(1^\lambda, d)$ be a DPVS generation algorithm. That is, $G_{DPVS}$ is an algorithm that takes as input a unary encoded security parameter $1^\lambda$ and a natural number d indicating a dimension, and generates param$_\mathbb{V}$.

*Description of Configurations*
<Construction of PHPE>

In the first embodiment, a key-policy (KP)-PHPE scheme will be described. KP signifies that information for access control is set in a decryption key.

In particular, in the first embodiment, the KP-PHPE scheme in an attribute-only mode will be described. The attribute-only mode signifies that no payload is included in a ciphertext. That is, the attribute-only mode signifies that no message to be encrypted is included in a ciphertext. Note that a method for modifying the KP-PHPE scheme in the attribute-only mode to the KP-PHPE scheme of a version in which a payload is included in a ciphertext is obvious to those skilled in the art and can be easily realized.

The KP-PHPE scheme includes a PHPE.Setup algorithm, a PHPE.Encrypt algorithm, a PHPE.KeyGen algorithm, and a PHPE.Decrypt algorithm.

The PHPE.Setup algorithm takes as input a security parameter $\lambda$, a length n' of a public attribute vector, and a length n of a secret attribute vector, and outputs a public parameter MPK and a master secret key MSK.

The PHPE.Encrypt algorithm takes as input the public parameter MPK, a public attribute vector $\vec{x} \in \mathbb{F}_q^{n'}$, and a secret attribute vector $\vec{z} \in \mathbb{F}_q^n$, and outputs a ciphertext CT.

The PHPE.KeyGen algorithm takes as input the public parameter MPK, the master secret key MSK, and a function $f \in \mathbb{F}^{(q,n',n)}{}_{ABP \circ IP}$, and outputs a decryption key SK(f).

The PHPE.Decrypt algorithm takes as input the public parameter MPK, the decryption key SK(f) for the function $f \in \mathbb{F}^{(q,n',n)}{}_{ABP \circ IP}$, and the ciphertext CT, and outputs 1 or 0.

<Configuration of Cryptographic System 1>

Referring to FIG. 1, a configuration of a cryptographic system 1 according to the first embodiment will be described.

The cryptographic system 1 includes a setup device 10, an encryption device 20, a key generation device 30, and a decryption device 40. The setup device 10, the encryption device 20, the key generation device 30, and the decryption device 40 are computers. The setup device 10, the encryption device 20, the key generation device 30, and the decryption device 40 are connected via a network.

Figure 2:
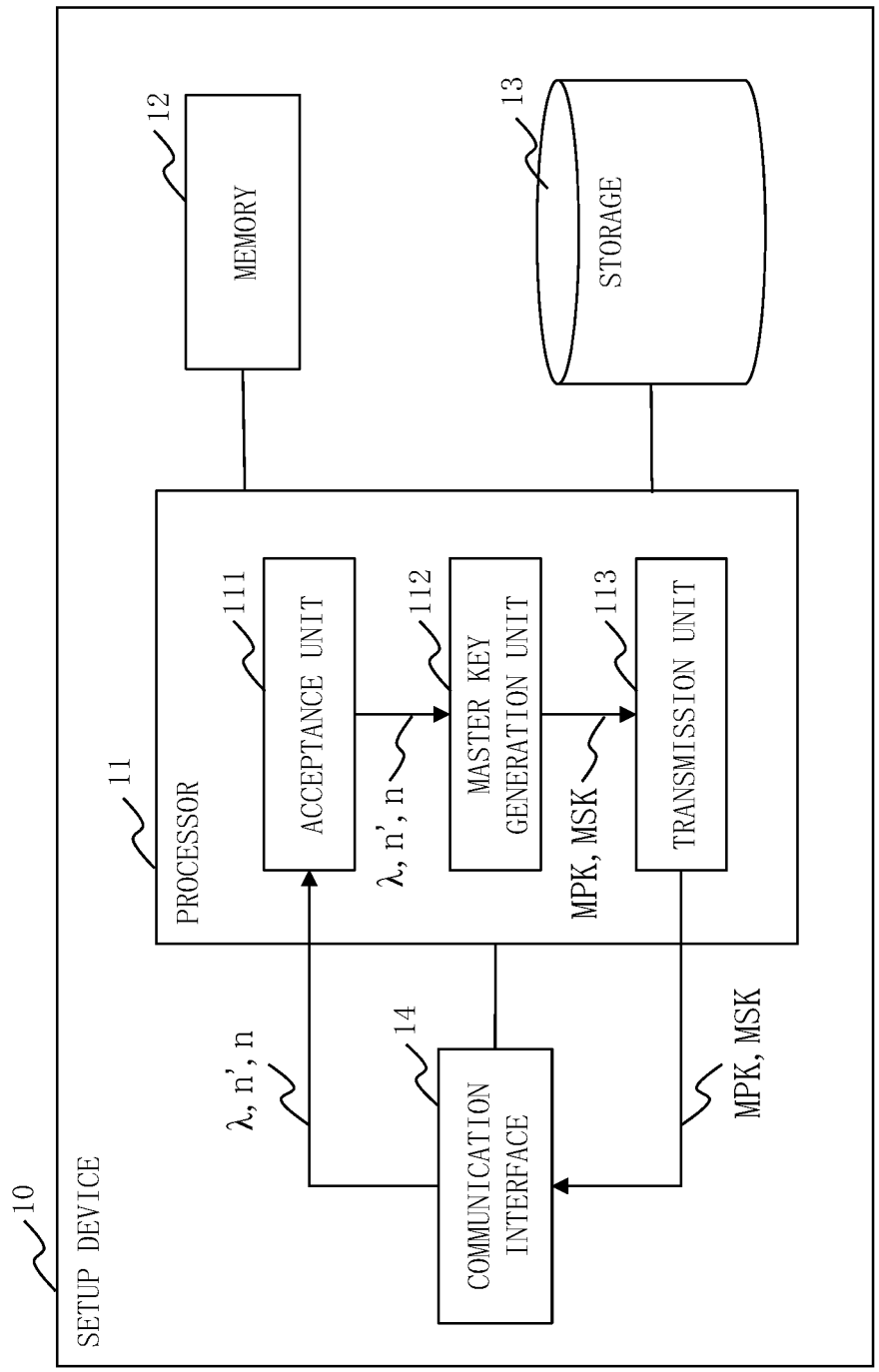
FIG. 2 is a configuration diagram of a setup device 10 according to the first embodiment.

Referring to FIG. 2, a configuration of the setup device 10 according to the first embodiment will be described.

The setup device 10 is a computer to execute the PHPE.Setup algorithm.

The setup device 10 includes hardware of a processor 11, a memory 12, a storage 13, and a communication interface 14. The processor 11 is connected with the other hardware components via signal lines and controls the other hardware components.

The setup device 10 includes, as functional components, an acceptance unit 111, a master key generation unit 112, and a transmission unit 113. The functions of the functional components of the setup device 10 are realized by software.

The storage 13 stores programs for realizing the functions of the functional components of the setup device 10. These programs are loaded into the memory 12 by the processor 11 and executed by the processor 11. This realizes the functions of the functional components of the setup device 10.

Figure 3:
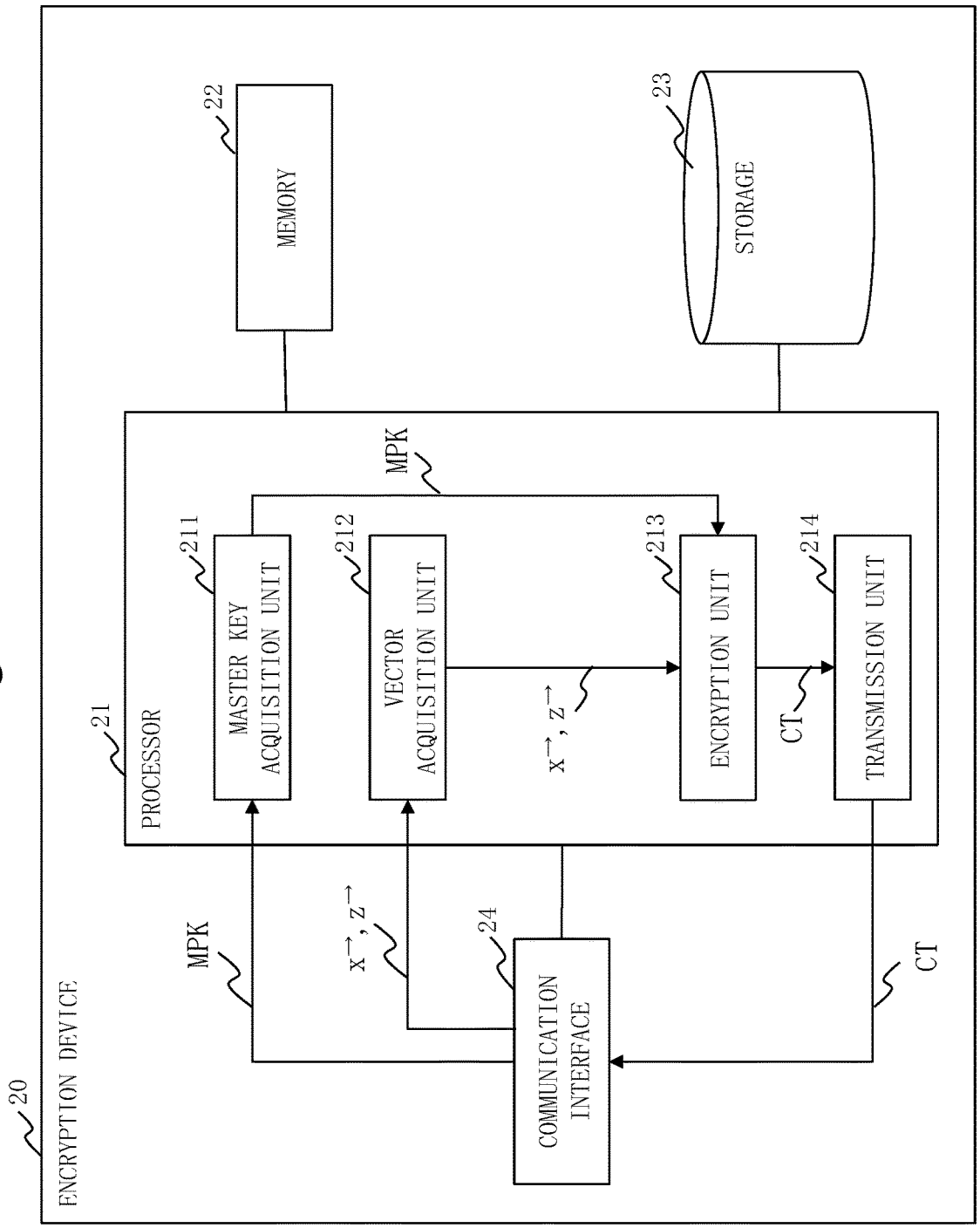
FIG. 3 is a configuration diagram of an encryption device 20 according to the first embodiment.

Referring to FIG. 3, a configuration of the encryption device 20 according to the first embodiment will be described.

The encryption device 20 is a computer to execute the PHPE.Encrypt algorithm.

The encryption device 20 includes hardware of a processor 21, a memory 22, a storage 23, and a communication interface 24. The processor 21 is connected with the other hardware components via signal lines and controls the other hardware components.

The encryption device 20 includes, as functional components, a master key acquisition unit 211, a vector acquisition unit 212, an encryption unit 213, and a transmission unit 214. The functions of the functional components of the encryption device 20 are realized by software.

The storage 23 stores programs for realizing the functions of the functional components of the encryption device 20. These programs are loaded into the memory 22 by the processor 21 and executed by the processor 21. This realizes the functions of the functional components of the encryption device 20.

Figure 4:
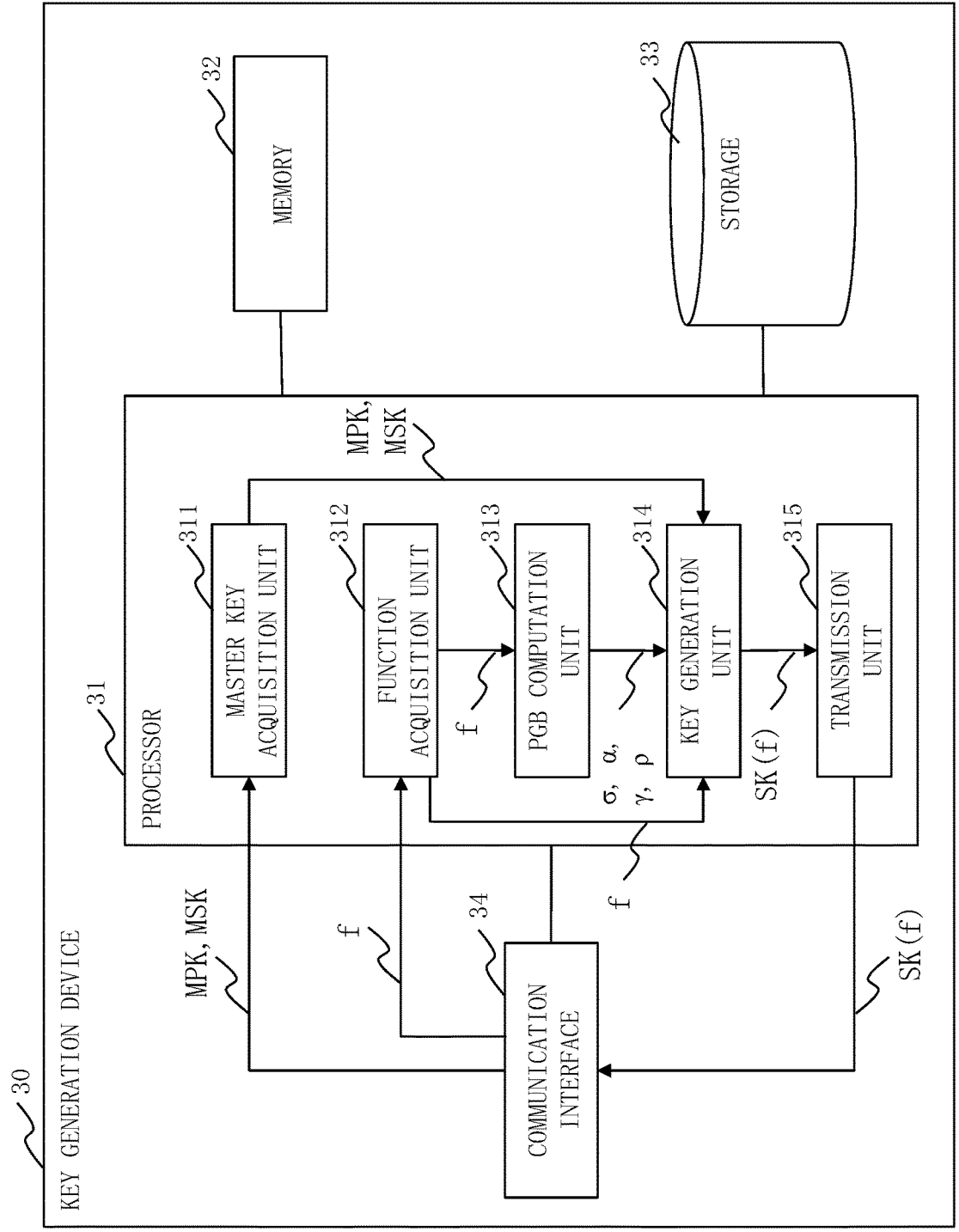
FIG. 4 is a configuration diagram of a key generation device 30 according to the first embodiment.

Referring to FIG. 4, a configuration of the key generation device 30 according to the first embodiment will be described.

The key generation device 30 is a computer to execute the PHPE.KeyGen algorithm.

The key generation device 30 includes hardware of a processor 31, a memory 32, a storage 33, and a communication interface 34. The processor 31 is connected with the other hardware components via signal lines and controls the other hardware components.

The key generation device 30 includes, as functional components, a master key acquisition unit 311, a function acquisition unit 312, a PGB computation unit 313, a key generation unit 314, and a transmission unit 315. The functions of the functional components of the key generation device 30 are realized by software.

The storage 33 stores programs for realizing the functions of the functional components of the key generation device 30. These programs are loaded into the memory 32 by the processor 31 and executed by the processor 31. This realizes the functions of the functional components of the key generation device 30.

Figure 5:
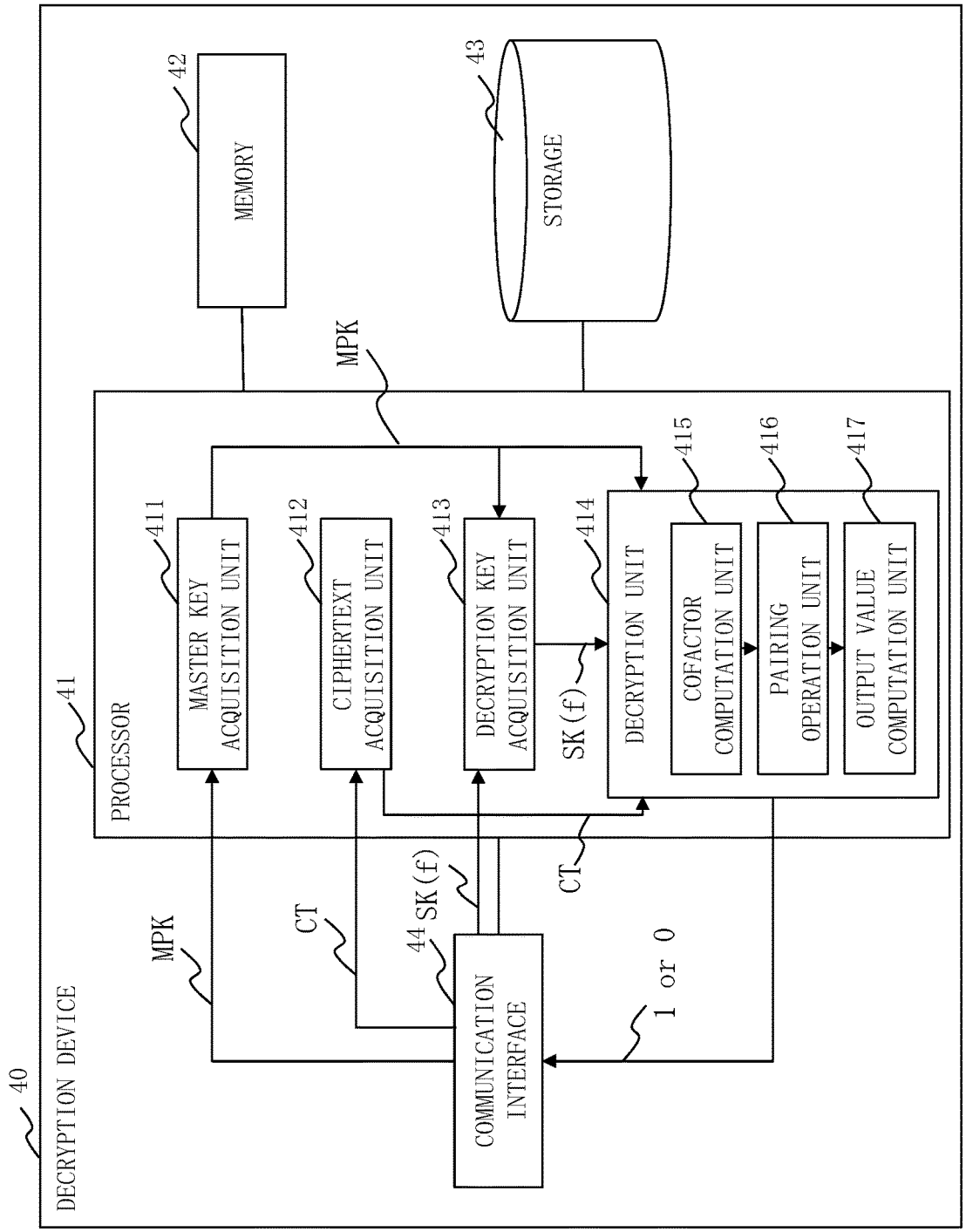
FIG. 5 is a configuration diagram of a decryption device 40 according to the first embodiment.

Referring to FIG. 5, a configuration of the decryption device 40 according to the first embodiment will be described.

The decryption device 40 is a computer to execute the PHPE.Decrypt algorithm.

The decryption device 40 includes hardware of a processor 41, a memory 42, a storage 43, and a communication interface 44. The processor 41 is connected with the other hardware components via signal lines and controls the other hardware components.

The decryption device 40 includes, as functional components, a master key acquisition unit 411, a ciphertext acquisition unit 412, a decryption key acquisition unit 413, and a decryption unit 414. The decryption unit 414 includes a cofactor computation unit 415, a pairing operation unit 416, and an output value computation unit 417. The functions of the functional components of the decryption device 40 are realized by software.

The storage 43 stores programs for realizing the functions of the functional components of the decryption device 40. These programs are loaded into the memory 42 by the processor 41 and executed by the processor 41. This realizes the functions of the functional components of the decryption device 40.

Each of the processors 11, 21, 31, and 41 is an integrated circuit (IC) that performs processing. As a specific example, each of the processors 11, 21, 31, and 41 is a central processing unit (CPU), a digital signal processor (DSP), or a graphics processing unit (GPU).

Each of the memories 12, 22, 32, and 42 is a storage device to temporarily store data. As a specific example, each of the memories 12, 22, 32, and 42 is a static random access memory (SRAM) or a dynamic random access memory (DRAM).

Each of the storages 13, 23, 33, and 43 is a storage device to store data. As a specific example, each of the storages 13, 23, 33, and 43 is a hard disk drive (HDD). Alternatively, each of the storages 13, 23, 33, and 43 may be a portable recording medium such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

Each of the communication interfaces 14, 24, 34, and 44 is an interface for communicating with external devices. As a specific example, each of the communication interfaces 14, 24, 34, and 44 is an Ethernet (registered trademark) port, a Universal Serial Bus (USB) port, or a High-Definition Multimedia Interface (HDMI, registered trademark) port.

FIG. 2 illustrates only one processor 11. However, a plurality of processors 11 may be included, and the plurality of processors 11 may cooperate to execute the programs for realizing the functions. Similarly, a plurality of processors 21, a plurality of processors 31, and a plurality of processors 41 may be included, and the plurality of processors 21 may cooperate, the plurality of processors 31 may cooperate, and the plurality of processors 41 may cooperate to execute the programs for realizing the respective functions.

Referring to FIGS. 6 to 11, operation of the cryptographic system 1 according to the first embodiment will be described.

The operation of the cryptographic system 1 according to the first embodiment corresponds to a cryptographic method according to the first embodiment. The operation of the cryptographic system 1 according to the first embodiment also corresponds to processes of a cryptographic program according to the first embodiment.

Figure 6:
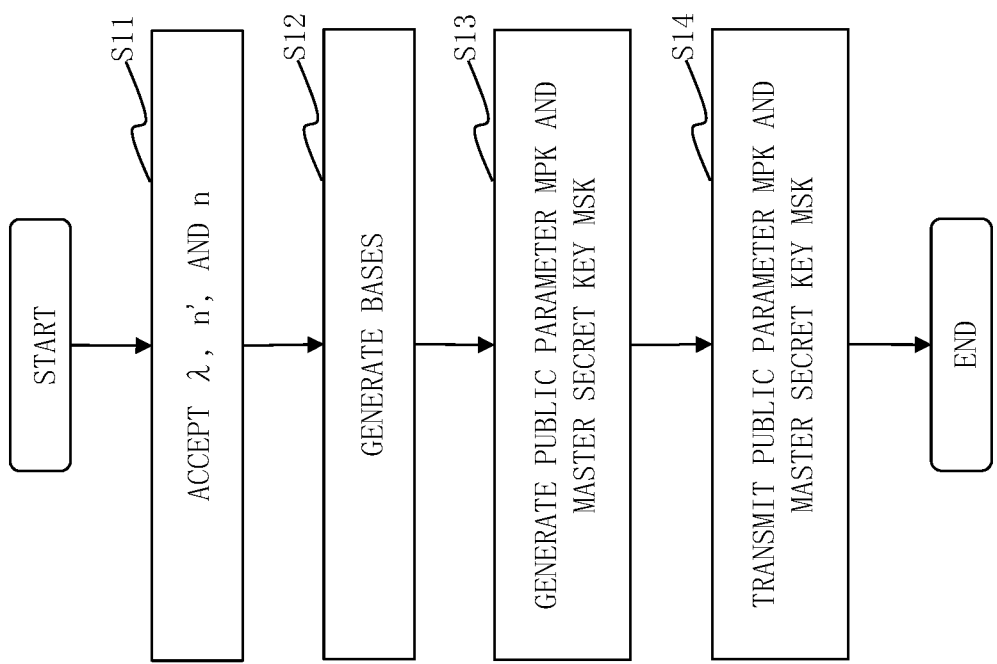
FIG. 6 is a flowchart illustrating operation of the setup device 10 according to the first embodiment.

Referring to FIG. 6, operation of the setup device 10 according to the first embodiment will be described.

The operation of the setup device 10 according to the first embodiment corresponds to a setup method according to the first embodiment. The operation of the setup device 10 according to the first embodiment also corresponds to processes of a setup program according to the first embodiment.

(Step S11: Acceptance Process)

The acceptance unit 111 accepts input of a security parameter $\lambda$, a length n' of a public attribute vector, and a length n of a secret attribute vector. Both the length n' of the public attribute vector and the length n of the secret attribute vector are integers of 1 or more.

Specifically, the acceptance unit 111 accepts, via the communication interface 14, the security parameter $1^\lambda$ input by a user of the setup device 10. The acceptance unit 111 writes the security parameter $1^\lambda$ in the memory 12.

(Step S12: Basis Generation Process)

The master key generation unit 112 generates params and orthonormal dual bases $\{B_\iota, B^*_\iota\}_{\iota \in [n'+n]}$, using as input the security parameter $\lambda$, the length n' of the public attribute vector, and the length n of the secret attribute vector accepted in step S11.

Specifically, the master key generation unit 112 retrieves the security parameter $\lambda$, the length n' of the public attribute vector, and the length n of the secret attribute vector from the memory 12. The master key generation unit 112 generates params and the dual bases $\{B_\iota, B^*_\iota\}_{\iota \in [n'+n]}$ by executing an algorithm $G_{OB}$ indicated in Formula 141, where N=n'+n, $d_0$=0, and $d_1, \ldots, d_N$=9. The master key generation unit 112 writes params and the dual bases $\{B_\iota, B^*_\iota\}_{\iota \in [n'+n]}$ in the memory 12.

$$G_{OB}(N, (d_0, \ldots, d_N)): \qquad \text{[Formula 141]}$$

$$\text{params}_\mathbb{G} = (q, \mathbb{G}_1, \mathbb{G}_2, \mathbb{G}_T, g_1, g_2, e) \xleftarrow{R} G_{BPG}(),$$

$$\psi \xleftarrow{U} \mathbb{F}_q \backslash \{0\}, g_T = e(g_1, g_2)\psi,$$

for $t \in [0, N]$ $$\text{params}_\mathbb{V} = (q, \mathbb{V}_{\iota,1}, \mathbb{V}_{\iota,2}, \mathbb{G}_T, \mathbb{A}_{\iota,1}, \mathbb{A}_{\iota,2}e)$$

$$\xleftarrow{R} G_{DPVS}(d_\iota, \text{params}_\mathbb{G}),$$

-continued $$B^{(\iota)} = (b_{L,k}^{(\iota)}) \xleftarrow{U} GL(d_\iota, \mathbb{F}_q),$$

$$B^{*(\iota)} = (b_{L,k}^{*(\iota)}) = \psi((B^{(\iota)})^{-1})^T,$$

for all $L \in [d_\iota]$, let $\overline{b}^{(\iota,L)}$ and $\overline{b}^{*(\iota,L)} L^{th}$ rows of $B^{(\iota)}$ and $B^{*(\iota)}$, $b^{(\iota,L)} = (\overline{b}^{(\iota,L)})_{\mathbb{A}_{\iota,1}}$, $b^{*(\iota,L)} = \overline{b}^{*(\iota,L)}_{\mathbb{A}_{\iota,2}}$ for $L \in [d_\iota]$, $\mathbb{B}_\iota = \{b^{(\iota,1)}, \ldots, b^{(\iota,d_\iota)}\}$, $$\mathbb{B}_\iota^* = \{b^{*(\iota,1)}, \ldots, b^{*(\iota,d_\iota)}\},$$

$$\text{params} = (\{\text{params}_{\mathbb{V}_\iota}\}_{\iota \in [0,N]}, g_T),$$

$$\text{return}(\text{params}, \{\mathbb{B}_\iota, \mathbb{B}_\iota^*\}_{\iota \in [0,N]}).$$

(Step S13: Master Key Generation Process)

The master key generation unit 112 generates a public parameter MPK and a master secret key MSK, using params and the dual bases $\{\mathbb{B}_\iota, \mathbb{B}^*_\iota\}_{\iota \in [n'+n]}$ generated in step S12.

Specifically, the master key generation unit 112 retrieves params and the dual bases $\{\mathbb{B}_\iota, \mathbb{B}^*_\iota\}_{\iota \in [n'+n]}$ from the memory 12. The master key generation unit 112 generates a partial basis $\hat{\mathbb{B}}_\iota$ and a partial basis $\hat{\mathbb{B}}^*_\iota$, for each integer $\iota$ of $\iota \in [n'+n]$, as indicated in Formula 142.

for $\iota \in [n'+n]$ $$\hat{\mathbb{B}}_\iota = \{b^{(\iota,1)}, b^{(\iota,2)}, b^{(\iota,9)}\} \hat{\mathbb{B}}^*_\iota = \{b^{*(\iota,1)}, b^{*(\iota,2)}, b^{*(\iota,7)}, b^{*(\iota,8)}\}$$ [Formula 142]

The master key generation unit 112 sets params and the partial basis $\hat{\mathbb{B}}_\iota$ for each integer $\iota$ of $\iota \in [n'+n]$ as the public parameter MPK. The master key generation unit 112 sets the partial basis $\hat{\mathbb{B}}^*_\iota$ for each integer $\iota$ of $\iota \in [n'+n]$ as the master secret key MSK. The master key generation unit 112 writes the public parameter MPK and the master secret key MSK in the memory 12.

(Step S14: Transmission Process)

The transmission unit 113 publishes the public parameter MPK generated in step S13. Specifically, the transmission unit 113 retrieves the public parameter MPK from the memory 12. The transmission unit 113 publishes the public parameter MPK by a method such as transmitting it to a server for publication. This allows the encryption device 20, the key generation device 30, and the decryption device 40 to acquire the public parameter MPK.

The transmission unit 113 transmits the master secret key MSK generated in step S13 to the key generation device 30 in secrecy. Specifically, the transmission unit 113 retrieves the master secret key MSK from the memory 12. The transmission unit 113 encrypts the master secret key MSK with an existing encryption scheme and then transmits the master secret key MSK to the key generation device 30.

That is, the setup device 10 executes the PHPE.Setup algorithm indicated in Formula 143.

$\text{PHPE.Setup}(1^{n'}, 1^n):$ [Formula 143]

$$(\text{params}, \{\mathbb{B}_\iota, \mathbb{B}^*_\iota\}_{\iota \in [n'+n]}) \xleftarrow{R} G_{OB}\left(n' + n, \left(0, \overbrace{9, \ldots, 9}^{n'+n}\right)\right),$$

for $\iota \in [n' + n]$ $\hat{\mathbb{B}}_\iota = \{b^{(\iota,1)}, b^{(\iota,2)}, b^{(\iota,9)}\},$ $\hat{\mathbb{B}}^*_\iota = \{b^{*(\iota,1)}, b^{*(\iota,2)}, b^{*(\iota,7)}, b^{*(\iota,8)}\},$ output $MPK = (\text{params}, \{\hat{\mathbb{B}}_\iota\}_{\iota \in [n'+n]}),$ $MSK = \{\hat{\mathbb{B}}^*_\iota\}_{\iota \in [n'+n]}.$ Referring to FIG. 7, operation of the encryption device 20 according to the first embodiment will be described.

The operation of the encryption device 20 according to the first embodiment corresponds to an encryption method according to the first embodiment. The operation of the encryption device 20 according to the first embodiment also corresponds to processes of an encryption program according to the first embodiment.

(Step S21: Master Key Acquisition Process)

The master key acquisition unit 211 acquires the public parameter MPK generated by the setup device 10.

Specifically, the master key acquisition unit 211 acquires, via the communication interface 24, the public parameter MPK that is published. The master key acquisition unit 211 writes the public parameter MPK in the memory 22.

(Step S22: Vector Acquisition Process)

The vector acquisition unit 212 acquires a public attribute vector $\vec{x} \in \mathbb{F}_q^{n'}$ and a secret attribute vector $\vec{z} \in \mathbb{F}_q^n$.

Specifically, the vector acquisition unit 212 acquires, via the communication interface 24, the public attribute vector $\vec{x}$ and the secret attribute vector $\vec{z}$ that are input by a user of the encryption device 20. The vector acquisition unit 212 writes the public attribute vector $\vec{x}$ and the secret attribute vector $\vec{z}$ in the memory 22.

(Step S23: Encryption Process)

The encryption unit 213 generates a ciphertext CT, using the public parameter MPK acquired in step S21 and the public attribute vector $\vec{x}$ and the secret attribute vector $\vec{z}$ acquired in step S22.

Specifically, the encryption unit 213 generates the ciphertext CT as described below.

First, the encryption unit 213 samples a value $\omega$, as indicated in Formula 144.

$$\omega \xleftarrow{U} \mathbb{F}_q$$ [Formula 144]

Next, the encryption unit 213 samples a value $\varphi'_{\iota'}$ and generates an element $c'^{(\iota')}$, for each integer $\iota'$ of $\iota' \in [n']$, as indicated in Formula 145.

for $\iota' \in [n']$ [Formula 145]

$$\phi'_{\iota'} \xleftarrow{U} \mathbb{F}_q,$$

$$c'(\iota') = (\omega(1, x_{\iota'}), \vec{0}^4, \vec{0}^2, \phi'_{\iota'})_{\mathbb{B}_\iota}.$$

The encryption unit 213 samples a value $\varphi_\iota$ and generates an element $c^{(\iota)}$, for each integer $\iota$ of $\iota \in [n]$, as indicated in Formula 146.

for $\iota \in [n]$ [Formula 146]

$$\phi_\iota \xleftarrow{U} \mathbb{F}_q,$$

$$c^{(\iota)} = (\omega(I, z_\iota), \vec{0}^4, \vec{0}^2, \phi_\iota)_{\mathbb{B}_{n'+1}}$$

Then, the encryption unit 213 sets the public attribute vector $\vec{x}$, the element $c'^{(\iota')}$ for each integer $\iota'$ of $\iota' \in [n']$, and the element $c^{(\iota)}$ for each integer $\iota$ of $\iota \in [n]$ as the ciphertext CT. The encryption unit 213 writes the ciphertext CT in the memory 22.

In the first embodiment, the ciphertext CT includes the element $c'^{(\iota')}$ in which the public attribute vector $\vec{x}$ is set and the element $c^{(\iota)}$ in which the secret attribute vector $\vec{z}$ is set, over a basis B of the basis B and a basis B*, which are dual bases in dual vector spaces.

(Step S24: Transmission Process)

The transmission unit 214 transmits the ciphertext CT generated in step S23 to the decryption device 40.

Specifically, the transmission unit 214 retrieves the ciphertext CT from the memory 22. The transmission unit 214 transmits the ciphertext CT to the decryption device 40 via the communication interface 24.

That is, the encryption device 20 executes the PHPE.Encrypt algorithm indicated in Formula 147.

$$PHPE.\text{Encrypt}(MPK, (\vec{x}, \vec{z})):\qquad [\text{Formula 147}]$$

$$\omega \xleftarrow{U} \mathbb{F}_q,$$

for $\iota' \in [n']$ $$\phi'_{\iota'} \xleftarrow{U} \mathbb{F}_q, c'(\iota') = (\omega(1, x_{\iota'}), \vec{0}^4, \vec{0}^2, \phi'_{\iota'})_{\mathbb{B}_{\iota'}},$$

for $\iota \in [n]$ $$\phi_\iota \xleftarrow{U} \mathbb{F}_q, c^{(\iota)} = (\omega(1, z_\iota), \vec{0}^4, \vec{0}^2, \phi_\iota)_{\mathbb{B}_{n'+1}},$$

output $CT = (\vec{x}, \{c'^{(\iota')}\}_{\iota' \in [n']}, \{c^{(\iota)}\}_{\iota \in [n]})$.

Figure 8:
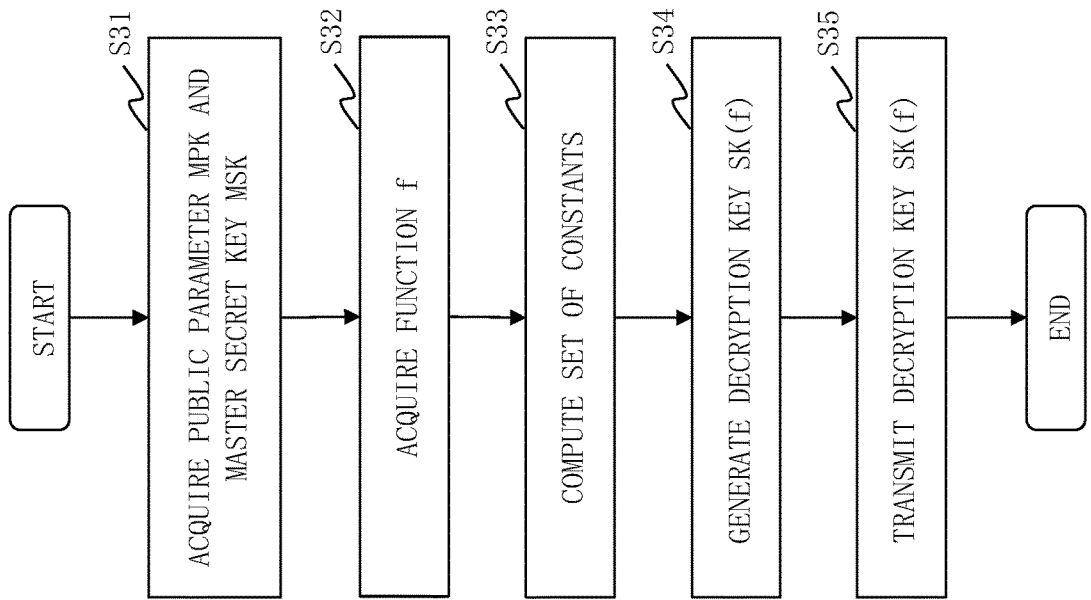
FIG. 8 is a flowchart illustrating operation of the key generation device 30 according to the first embodiment.

Referring to FIG. 8, operation of the key generation device 30 according to the first embodiment will be described.

The operation of the key generation device 30 according to the first embodiment corresponds to a key generation method according to the first embodiment. The operation of the key generation device 30 according to the first embodiment also corresponds to processes of a key generation program according to the first embodiment.

(Step S31: Master Key Acquisition Process)

The master key acquisition unit 311 acquires the public parameter MPK and the master secret key MSK that are generated by the setup device 10.

Specifically, the master key acquisition unit 311 acquires, via the communication interface 34, the public parameter MPK that is published, and acquires the master secret key MSK transmitted by the setup device 10. The master key acquisition unit 311 writes the public parameter MPK and the master secret key MSK in the memory 32.

(Step S32: Function Acquisition Process)

The function acquisition unit 312 acquires a function $f \in \mathbb{F}^{(q,n',n)}_{ABP \circ IP}$.

Specifically, the function acquisition unit 312 acquires, via the communication interface 34, the function f input by a user of the key generation device 30. The function acquisition unit 312 writes the function f in the memory 32.

(Step S33: PGB Computation Process)

The PGB computation unit 313 computes a set of constants $(\{\sigma_j\}_{j \in [n]}, \{\alpha_{j'}, \gamma_{j'}\}_{j' \in [m]}) \in \mathbb{F}_q^n \times (\mathbb{F}_q^2)^m$ for specifying shares and a function $\rho: [m] \to [n']$ by executing the PGB algorithm, using as input the function f acquired in step S32, as indicated in Formula 148.

$$\left((\{\sigma_j\}_{j \in [n]}, \{\alpha_{j'}, \gamma_{j'}\}_{j' \in [m]}), \rho: [m] \to [n']\right) \xleftarrow{R} PGB(f) \qquad [\text{Formula 148}]$$

Figure 9:
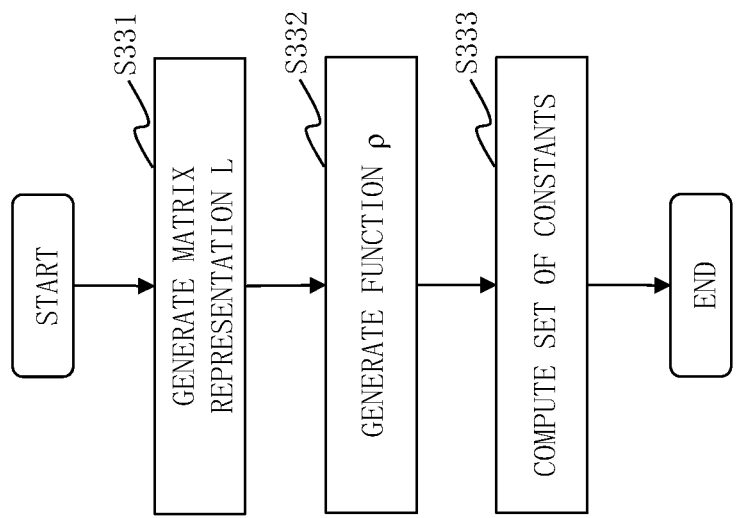
FIG. 9 is a flowchart illustrating a PGB computation process according to the first embodiment.

Referring to FIG. 9, a PGB computation process according to the first embodiment will be described.

(Step S331: Matrix Representation L Generation Process)

Let Γ denote an ABP computing the function f. The ABP Γ has m+n+1 vertices, and a variable $z_j$ is set only in edges leading into the sink vertex. Every vertex has only one outgoing edge.

The PGB computation unit 313 computes a matrix representation $L \in \mathbb{F}_q^{(m+n) \times (m+n)}$ representing the ABP Γ. As described above, the matrix L is obtained by removing the column corresponding to $V_0$ and the row corresponding to $V_1$ from the matrix $A_\Gamma - I$, where the matrix $A_\Gamma$ is the adjacency matrix for Γ and I is the identity matrix.

Then, the following (1) to (4) hold.

(1) For all $(\vec{x}, \vec{z}) \in \mathbb{F}_q^n \times \mathbb{F}_q^n$, $\det(L(\vec{x}, \vec{z})) = f(\vec{x}, \vec{z})$ holds.

(2) For each integer j' of $j' \in [m]$, each entry in the j'th row of the matrix representation L is a degree one polynomial function in one variable $x_{\iota'}$ ($\iota' \in [n']$) with coefficients in $\mathbb{F}_q$ or a constant in $\mathbb{F}_q$.

(3) The matrix representation L contains only −1's in the second diagonal, and contains only 0's below the second diagonal.

(4) The last column of the matrix representation L is $(0, \ldots, 0, z_1, \ldots, z_n)$.

(Step S332: Function ρ Generation Process)

The PGB computation unit 313 generates the function ρ: $[m] \to [n']$ by setting $\rho(j') = \iota'$ if the variable $x_{\iota'}$ is included in the j'th row of the matrix representation L, for each integer j' of $j' \in [m]$. The PGB computation unit 313 writes the function ρ in the memory 32.

(Step S333: Constant Computation Process)

The PGB computation unit 313 chooses a vector $\vec{r}$, as indicated in Formula 149.

$$\vec{r} \xleftarrow{U} \mathbb{F}_q^{m+n-1} \qquad [\text{Formula 149}]$$

The PGB computation unit 313 computes a set of constants $(\{\sigma_j\}_{j \in [n]}, \{\alpha_j, \gamma_j\}_{j' \in [m]}) \in \mathbb{F}_q^n \times (\mathbb{F}_q^2)^m$, using the matrix representation L generated in step S331 and the vector $\vec{r}$, as indicated in Formula 150.

$$L\begin{pmatrix} \vec{r}^T \\ 1 \end{pmatrix} = \qquad [\text{Formula 150}]$$

$$(\alpha_1 x_{\rho(1)} + \gamma_1, \ldots, \alpha_m x_{\rho(m)} + \gamma_m, z_1 + \sigma_1, \ldots, z_n + \sigma_n)^T$$

By this, the set of constants $(\{\sigma_j\}_{j \in [n]}, \{\alpha_j, \gamma_j\}_{j' \in [m]})$ is generated. The PGB computation unit 313 writes the set of constants $(\{\sigma_j\}_{j \in [n]}, \{\alpha_j, \gamma_j\}_{j' \in [m]})$ in the memory 32. The set of constants $(\{\sigma_j\}_{j \in [n]}, \{\alpha_j, \gamma_j\}_{j' \in [m]})$ is referred to as a predicate vector of the ABP.

(Step S34: Key Generation Process)

The key generation unit 314 generates a decryption key SK(f), using the public parameter MPK and the master secret key MSK acquired in step S31, the function f acquired in step S32, and the set of constants $(\{\sigma_j\}_{j \in [n]}, \{\alpha_j, \gamma_j\}_{j' \in [m]})$ generated in step S33.

Specifically, the key generation unit 314 generates the decryption key SK(f) as described below.

First, the key generation unit 314 samples a value ζ, as indicated in Formula 151.

$$\varsigma \xleftarrow{U} \mathbb{F}_q \qquad \text{[Formula 151]}$$

Next, the key generation unit 314 samples $\vec{\kappa}'^{(j')}$ and generates an element $k'^{(j')}$, for each integer j' of j'∈ [m], as indicated in Formula 152.

for $j' \in [m]$  [Formula 152]

$$\vec{\kappa}'^{(j')} \xleftarrow{U} \mathbb{F}_q^2,$$

$$k'^{(j')} = \left((\gamma_{j'}, \alpha_{j'}), \vec{0}^4, \vec{\kappa}'^{(j')}, 0\right)_{\mathbb{B}^*_{\rho(j')}}$$

The key generation unit 314 samples $\vec{\kappa}^{(j)}$ and generates an element $k^{(j)}$, for each integer j of j∈ [n], as indicated in Formula 153.

for $j' \in [n]$  [Formula 153]

$$\vec{\kappa}'^{(j')} \xleftarrow{U} \mathbb{F}_q^2,$$

$$k^{(j)} = \left((\sigma_j, \varsigma), \vec{0}^4, \vec{\kappa}^{(j)}, 0\right)_{\mathbb{B}^*_{n+j}}$$

Then, the key generation unit 314 sets the function f, the element $k'^{(j')}$ for each integer j' of j'∈ [m], and the element $k^{(j)}$ for each integer j of j∈ [n] as the decryption key SK(f). The key generation unit 314 writes the decryption key SK(f) in the memory 32.

In the first embodiment, the decryption key SK(f) includes the element $k'^{(j')}$ and the element $k^{(j)}$ in which the predicate vector of ABP is set, over the basis B* of the basis B and the basis B*, which are dual bases in dual vector spaces.

(Step S35: Transmission Process)

The transmission unit 315 transmits the decryption key SK(f) generated in step S34 to the decryption device 40 in secrecy.

Specifically, the transmission unit 315 retrieves the decryption key SK(f) from the memory 32. The transmission unit 315 encrypts the decryption key SK(f) with an existing encryption scheme and then transmits the decryption key SK(f) to the decryption device 40 via the communication interface 34.

That is, the key generation device 30 executes the PHPE.KeyGen algorithm indicated in Formula 154.

*PHPE.KeyGen(MPK, MSK, f):*

$$\left(\left(\{\sigma_j\}_{j\in[n]}, \{\alpha_{j'}, \gamma_{j'}\}_{j'\in[m]}\right), \rho:[m]\to[n']\right) \xleftarrow{R} PGB(f),$$

$$\varsigma \xleftarrow{U} \mathbb{F}_q,$$

for $j' \in [n']$ $$\vec{\kappa}'^{(j')} \xleftarrow{U} \mathbb{F}_q^2, k^{(j)} = \left((\sigma_j, \varsigma), \vec{0}^4, \vec{\kappa}^{(j)}, 0\right)_{\mathbb{B}^*_{\rho(j')}},$$

for $j \in [n]$ $$\vec{\kappa}'^{(j)} \xleftarrow{U} \mathbb{F}_q^2, k^{(j)} = \left((\sigma_j, \varsigma), \vec{0}^4, \vec{\kappa}^{(j)}, 0\right)_{\mathbb{B}^*_{n+j}},$$

output $SK(f) = \left(f, \{k'^{(j')}\}_{j'\in[m]}, \{k^{(j)}\}_{j\in[n]}\right).$ Referring to FIG. 10, operation of the decryption device 40 according to the first embodiment will be described.

The operation of the decryption device 40 according to the first embodiment corresponds to a decryption method according to the first embodiment. The operation of the decryption device 40 according to the first embodiment also corresponds to processes of a decryption program according to the first embodiment.

(Step S41: Public Key Acquisition Process)

The master key acquisition unit 411 acquires the public parameter MPK generated by the setup device 10.

Specifically, the master key acquisition unit 411 acquires, via the communication interface 44, the public parameter MPK that is published. The master key acquisition unit 411 writes the public parameter MPK in the memory 42.

(Step S42: Ciphertext Acquisition Process)

The ciphertext acquisition unit 412 acquires the ciphertext CT generated by the encryption device 20.

Specifically, the ciphertext acquisition unit 412 acquires, via the communication interface 44, the ciphertext CT transmitted by the encryption device 20. The ciphertext acquisition unit 412 writes the ciphertext CT in the memory 42.

(Step S43: Decryption key acquisition process)

The decryption key acquisition unit 413 acquires the decryption key SK(f) generated by the key generation device 30.

Specifically, the decryption key acquisition unit 413 acquires, via the communication interface 44, the decryption key SK(f) transmitted by the key generation device 30. The decryption key acquisition unit 413 writes the decryption key SK(f) in the memory 42.

(Step S44: Decryption Process)

The decryption unit 414 decrypts the ciphertext CT by performing a pairing operation on the ciphertext CT acquired in step S42 and the decryption key SK(f) acquired in step S43.

Figure 11:
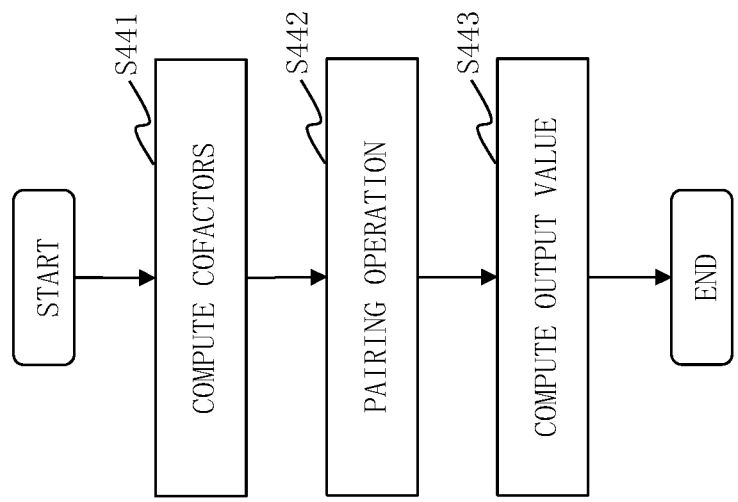
FIG. 11 is a flowchart illustrating a decryption process according to the first embodiment.

Referring to FIG. 11, a decryption process according to the first embodiment will be described.

(Step S441: Cofactor Computation Process)

The cofactor computation unit 415 computes a set of coefficients $((\{\Omega_j\}_{j\in[n]}, \{\Omega'_{j'}\}_{j'\in[m]}) \in \mathbb{F}_q^n \times \mathbb{F}_q^{n'}$ by executing the REC algorithm, using as input the function f included in the decryption key SK(f) and the public attribute vector $\vec{x}$ included in the ciphertext CT, as indicated in Formula 155.

$$(\{\Omega_j\}_{j\in[n]}, \{\Omega'_{j'}\}_{j'\in[m]}) = REC(f, \vec{x}) \qquad \text{[Formula 155]}$$

Specifically, the cofactor computation unit 415 generates a matrix representation L of the function f and a function ρ, as in the processes of steps S331 to S332 of FIG. 9. Then, the cofactor computation unit 415 computes cofactors of elements in the last column of the matrix representation L. The cofactor computation unit 415 sets the computed cofactors as the set of coefficients $((\{\Omega_j\}_{j\in[n]}, \{\Omega'_{j'}\}_{j'\in[m]})$ in order of entries. Note that the first m+n−1 columns of the matrix representation L contain only variables $\{x_\iota\}_{\iota\in[n]}$. Thus, the cofactors can be computed using the public attribute vector $\vec{x}$.

The cofactor computation unit 415 writes the set of coefficients $((\{\Omega_j\}_{j\in[n]}, \{\Omega'_{j'}\}_{j'\in[m]})$ in the memory 42.

(Step S442: Pairing Operation Process)

The pairing operation unit 416 performs a pairing operation on an element $c'^{(\rho(j'))}$ and an element $k'^{(j')}$ to compute an operation value $\Lambda'_{j'}$, for each integer j' of j'∈ [m], as indicated in Formula 156. Note that the function ρ is the function generated in step S441.

$$\Lambda'_j = e(c'^{(\rho(j'))}, k'^{(j')}) \text{ for } j' \in [m] \qquad \text{[Formula 156]}$$

The pairing operation unit 416 performs a pairing operation on an element $c^{(j)}$ and an element $k^{(j)}$ to compute an operation value $\Lambda_j$, for each integer j of j∈ [n], as indicated in Formula 157.

$$\Lambda_j = e(c^{(j)}, k^{(j)}) \text{ for } j \in [n] \quad \text{[Formula 157]}$$

The pairing operation unit 416 writes the operation value $\Lambda'_{j'}$ and the operation value $\Lambda_j$ in the memory 42.

(Step S443: Output Value Computation Process)

The output value computation unit 417 retrieves the set of coefficients $((\{\Omega_j\}_{j \in [n]}, \{\Omega'_{j'}\}_{j' \in [m]})$ computed in step S441 and the operation value $\Lambda'_{j'}$ and the operation value $\Lambda_j$ computed in step S442 from the memory 42. The output value computation unit 417 computes an operation value $\Lambda$, as indicated in Formula 158.

$$\Lambda = \left(\prod_{j' \in [m]} \Lambda'_{j'} \Omega'_{j'}\right)\left(\prod_{j \in [n]} \Lambda_j \Omega_j\right) \quad \text{[Formula 158]}$$

The output value computation unit 417 outputs 1 as an output value if $\Lambda$ is the identity element of the group $G_T$, and outputs 0 as an output value otherwise.

That is, the decryption device 40 executes the PHPE.Decrypt algorithm indicated in Formula 159.

PHPE.Decrypt(MPK, SK, (f), CT): [Formula 159]

$$\left(\{\Omega_j\}_{j \in [n]}, \{\Omega'_{j'}\}_{j' \in [m]}\right) = RECU(f, \vec{x}),$$

$$\Lambda'_{j'} = e(c'^{(\rho(j'))}, k'^{(j')}) \text{ for } j' \in [m],$$

$$\Lambda_j = e(c^{(j)}, k^{(j)}) \text{ for } j \in [n],$$

$$\Lambda = \left(\prod_{j' \in [m]} \Lambda'_{j'} \Omega'_{j'}\right)\left(\prod_{j \in [n]} \Lambda_j \Omega_j\right),$$

output 1, if $\Lambda = 1_{G_T}$, and 0 otherwise.

The operation value $\Lambda'_{j'}$ and the operation value $\Lambda_j$ are as indicated in Formula 160.

$$\Lambda'_{j'} = g_T^{\omega(\alpha_j x_{\rho(j')} + \gamma_{j'})} \text{ for } j' \in [m],$$

$$\Lambda_j = g_T^{\omega(\zeta z_j + \sigma_j)} \text{ for } j \in [n] \quad \text{[Formula 160]}$$

The operation value $\Lambda$ is as indicated in Formula 161.

$$\Lambda = g_T^{\omega \zeta f(\vec{x}, \vec{z})} \quad \text{[Formula 161]}$$

Therefore, except when ω=0 or ζ=0, Formula 162 holds if $R^{ABP \circ IP}(f, (\vec{x}, \vec{z}))=1$, that is, $f(\vec{x}, \vec{z})=0$, and Formula 163 holds if $R^{ABP \circ IP}(f, (\vec{x}, \vec{z})) \neq 1$, that is, $f(\vec{x}, \vec{z}) \neq 0$.

$$\Lambda = 1_{G_T} \quad \text{[Formula 162]}$$

$$\Lambda \neq 1_{G_T} \quad \text{[Formula 163]}$$

The reason why Formula 161 holds will be described.

As indicated in Formula 164, for any $\vec{z}$, $f(\vec{x}, \vec{z})$ can be computed by concatenating the sets of coefficients $((\{\Omega_j\}_{j \in [n]}, \{\Omega'_{j'}\}_{j' \in [m]})$ and $(\{z_j + \sigma_j\}_{j \in [n]}, \{\alpha_j z_{\rho(j')} + \gamma_{j'}\}_{j' \in [m]})$.

$$f(\vec{x}, \vec{z}) = \sum_{j' \in [m]} \Omega'_{j'}(\alpha_j x_{\rho(j')} + \gamma_{j'}) + \sum_{j \in [n]} \Omega_j(z_j + \sigma_j) \quad \text{[Formula 164]}$$

Note that Formula 164 corresponds to computing det(L' $(\vec{x}, \vec{z})$). A matrix representation L' is a matrix representation obtained by replacing the last column in the matrix representation L with Formula 165.

$$(\alpha_1 x_{\rho(1)} + \gamma_1, \ldots, \alpha_m x_{\rho(m)} + \gamma_m, z_1 + \sigma_1, \ldots, z_n + \sigma_n)^T \quad \text{[Formula 165]}$$

Therefore, Formula 166 holds and it can be known that Formula 164 holds.

[Formula 166]

$$\det(L'(\vec{x}, \vec{z})) =$$

$$\det(L(\vec{x}, \vec{z})) \begin{vmatrix} 1 & & r_1 \\ & \ddots & \vdots \\ & & 1 & r_{m+n-1} \\ & & & 1 \end{vmatrix} = \det(L(\vec{x}, \vec{z})) \cdot 1 = f(\vec{x}, \vec{z})$$

Note that $\vec{r} = (r_1, \ldots, r_{m+n-1}) \in F_q^{m+n-1}$ is the randomness used by the PBG when generating the set of constants $(\{\sigma_j\}_{j \in [n]}, \{\alpha_j, \gamma_j\}_{j' \in [m]})$.

Then, Formula 167 holds.

$$vf(x, z) = \sum_{j' \in [m]} \Omega'_{j'} \vec{v}(\alpha_j, x_{\rho(j')} + \gamma_{j'}) + \sum_{j \in [n]} \Omega_j(v z_j + \vec{v} \sigma_j) \quad \text{[Formula 167]}$$

This is because the first m entries of the last column are 0's so that Formula 168 holds.

$$\det(L(\vec{x}, \vec{z})) = \sum_{j \in [n]} \Omega_j z_j \quad \text{[Formula 168]}$$

Therefore, Formula 169 holds.

[Formula 169]

$$\vec{v}\left[\sum_{j' \in [m]} \Omega'_{j'}(\alpha_{j'} x_{\rho(j')} + \gamma_{j'}) + \sum_{j \in [n]} \Omega_j(z_j + \sigma_j)\right] +$$

$$(v - \vec{v}) \sum_{j \in [n]} \Omega_j z_j =$$

$$\vec{v} \det(L'(\vec{x}, \vec{z})) + (v - \vec{v}) \det(L(\vec{x}, \vec{z})) = v \det(L(\vec{x}, \vec{z})),$$

as $\det(L'(\vec{x}, \vec{z})) = \det(L(\vec{x}, \vec{z}))$

\*\*\*Effects of First Embodiment\*\*\*

As described above, in the cryptographic system 1 according to the first embodiment, a ciphertext is decrypted by performing a pairing operation on the ciphertext in which an attribute vector is set over a basis B and a decryption key in which a predicate vector of ABP is set over a basis B\*, the basis B and the basis B\* being dual bases in dual vector spaces. This makes it possible to realize a predicate encryption scheme that allows a wide range of predicates and also allows security to be enhanced.

\*\*\*Other Configurations\*\*\*

<First Variation>

In the first embodiment, the KP-PHPE scheme has been described. The KP-PHPE scheme described in the first embodiment can be converted into a Cipher-Policy (CP)-PHPE scheme. CP signifies that information for access control is set in a ciphertext. The information for access control in the first embodiment is the function f and the set of constants $(\{\sigma_j\}_{j \in [n]}, \{\alpha_j, \gamma_{j'}\}_{j' \in [m]})$.

Accordingly, in the case of the CP-PHPE scheme, in the PHPE.Encrypt algorithm, a set of constants ($\{\sigma_j\}_{j\in[n]}, \{\alpha_j, \gamma_j\}_{j\in[m]}$) is generated by executing the PGB algorithm, using as input a function f. In the PHPE.Encrypt algorithm, an element $c'^{(j')}$ and an element $c^{(j)}$ in which a set of constants ($\{\sigma_j\}_{j\in[n]}, \{\alpha_j, \gamma_j\}_{j\in[m]}$) is set, which correspond to the element $k'^{(j')}$ and the element $k^{(j)}$ in the first embodiment, are generated. Then, the function f, the element $c'^{(j')}$, and the element $c^{(j)}$ are set as a ciphertext CT.

In the case of the CP-PHPE scheme, in the PHPE.KeyGen algorithm, an element $k'^{(\iota')}$ in which a public attribute vector $\vec{x}$ is set, which corresponds to the element $c'^{(\iota')}$ in the first embodiment, is generated, and an element $k^{(\iota)}$ in which a secret attribute vector $\vec{z}$ is set, which corresponds to the element $c^{(\iota)}$ in the first embodiment, is generated. Then, the public attribute vector $\vec{x}$, the element $k'^{(\iota')}$, and the element $k^{(\iota)}$ are set as a decryption key SK(f).

<Second Variation>

In the first embodiment, the basis $B_\iota$ and the basis $B^*_\iota$ are generated for each integer $\iota$ of $\iota \in [n'+n]$. Then, a different basis is used for each element of the public attribute vector $\vec{x}$ and the secret attribute vector $\vec{z}$. However, by using an indexing technique, the PHPE scheme can be realized using only one pair of dual bases, the basis B and the basis $B^*$. This can make the scheme unbounded.

Specifically, for example, two dimensions are added to the dimensions of the basis B and the basis $B^*$. Then, using the added two dimensions, indices according to the elements of the public attribute vector $\vec{x}$ and the secret attribute vector $\vec{z}$ are set in the element $c'^{(\iota')}$ and the element $c^{(\iota)}$ of the ciphertext CT and the element $k'^{(j')}$ and the element $k^{(j)}$ of the decryption key SK(f). At this time, the indices are set in the element $c'^{(\iota')}$ and the element $c^{(\iota)}$ of the ciphertext CT and the element $k'^{(j')}$ and the element $k^{(j)}$ of the decryption key SK(f) such that performing a pairing operation results in a value of 0 between the added two dimensions.

<Third Variation>

In the first embodiment, the functional components are realized by software. However, as a third variation, the functional components may be realized by hardware. With regard to this third variation, differences from the first embodiment will be described.

Figure 12:
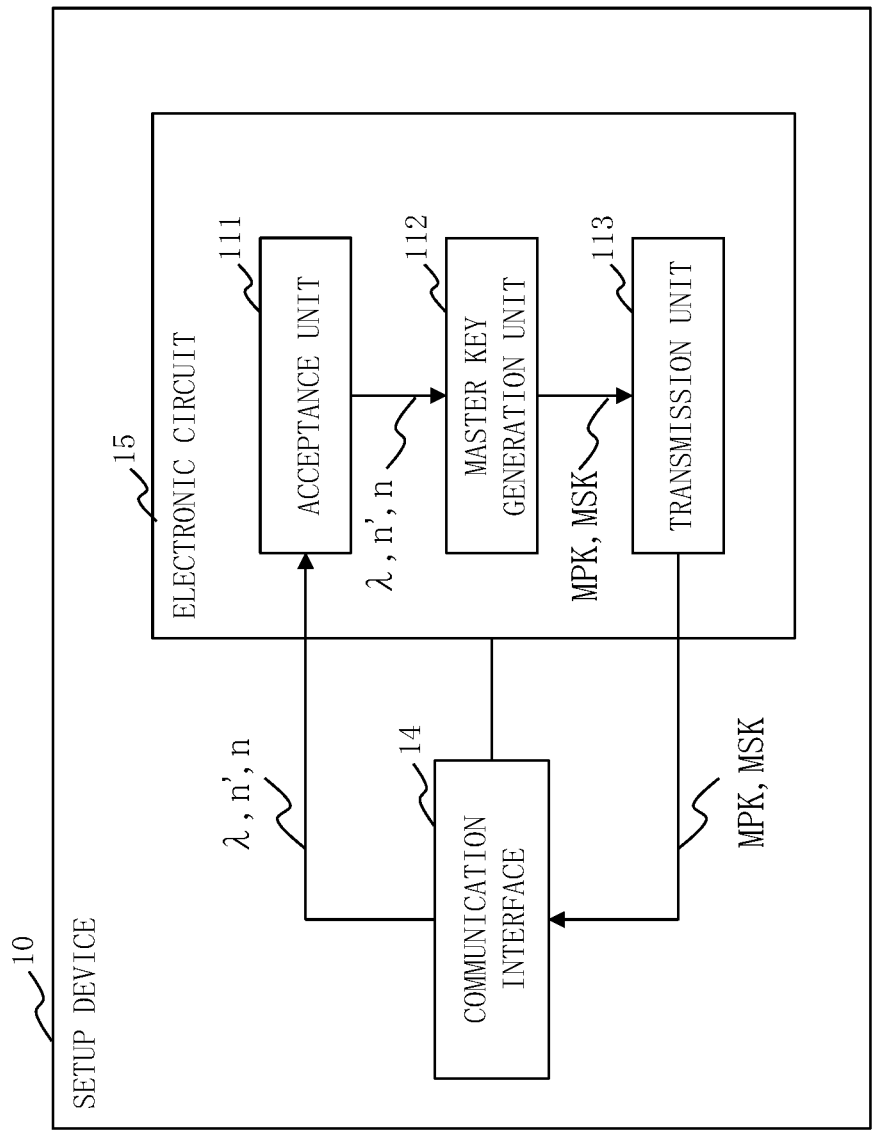
FIG. 12 is a configuration diagram of the setup device 10 according to a third variation.

Referring to FIG. 12, a configuration of the setup device 10 according to the third variation will be described.

When the functional components are realized by hardware, the setup device 10 includes an electronic circuit 15 in place of the processor 11, the memory 12, and the storage 13. The electronic circuit 15 is a dedicated circuit that realizes the functions of the functional components, the memory 12, and the storage 13.

Figure 13:
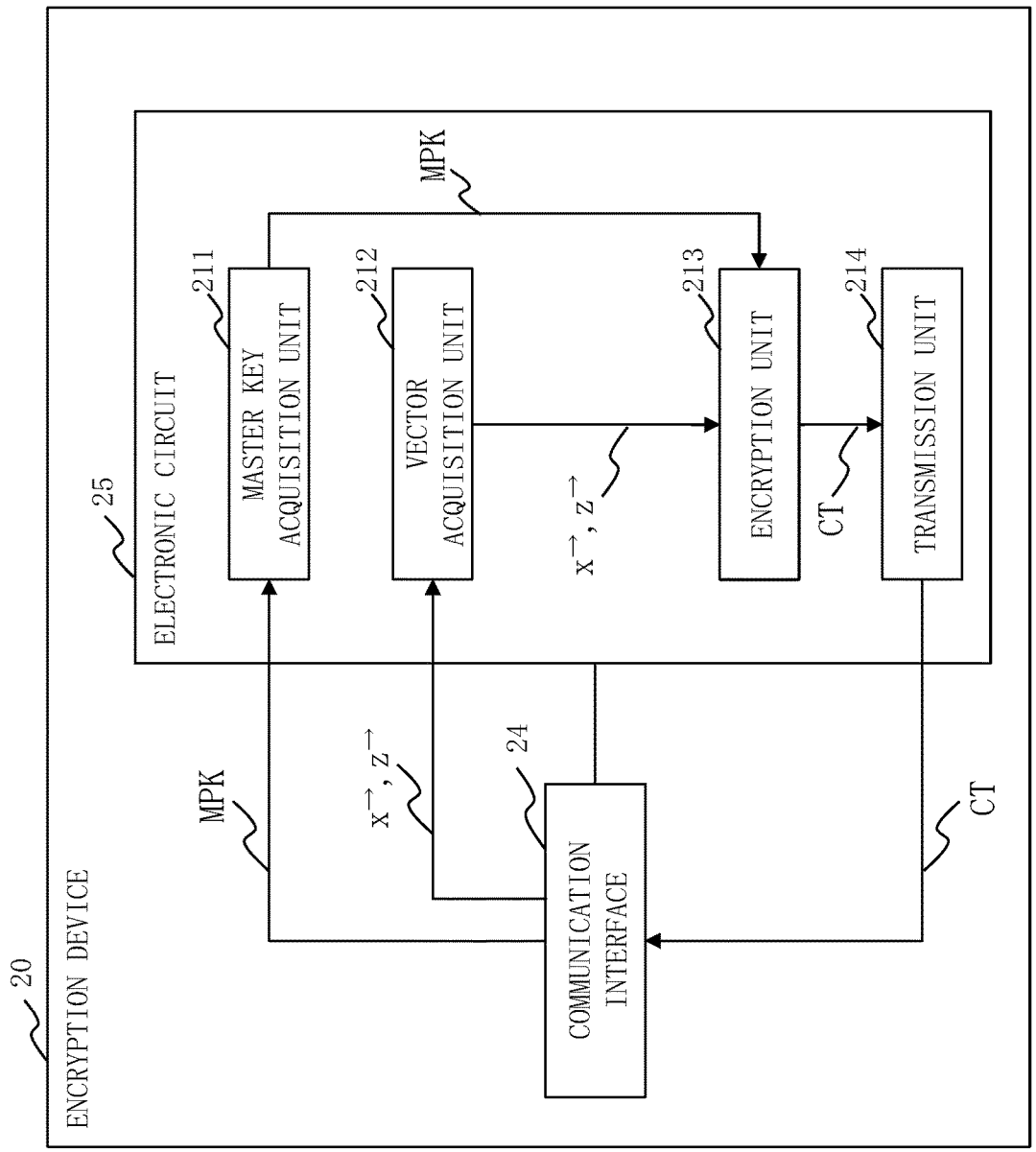
FIG. 13 is a configuration diagram of the encryption device 20 according to the third variation.

Referring to FIG. 13, a configuration of the encryption device 20 according to the third variation will be described.

When the functional components are realized by hardware, the encryption device 20 includes an electronic circuit 25 in place of the processor 21, the memory 22, and the storage 23. The electronic circuit 25 is a dedicated circuit that realizes the functions of the functional components, the memory 22, and the storage 23.

Figure 14:
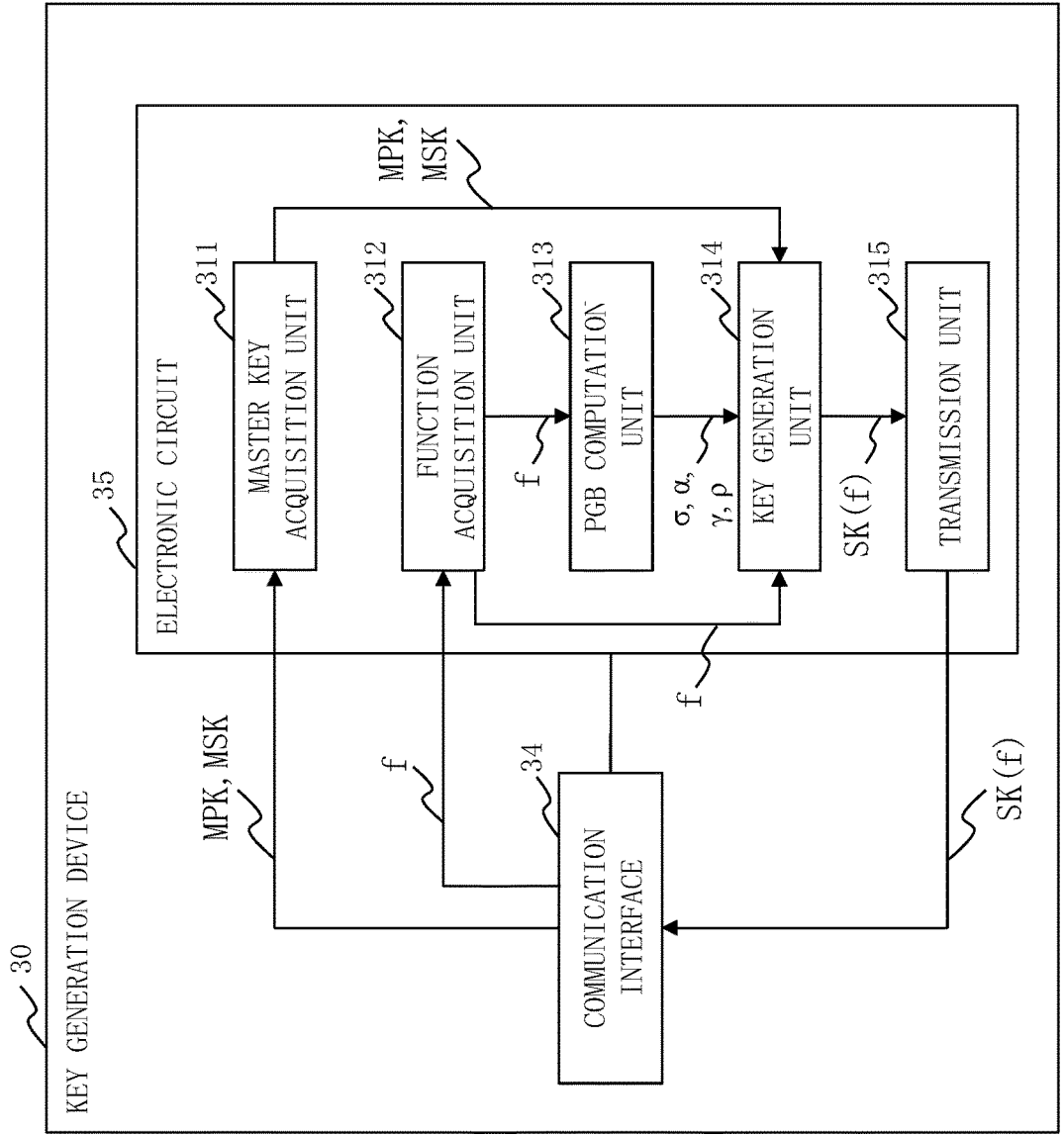
FIG. 14 is a configuration diagram of the key generation device 30 according to the third variation.

Referring to FIG. 14, a configuration of the key generation device 30 according to the third variation will be described.

When the functional components are realized by hardware, the key generation device 30 includes an electronic circuit 35 in place of the processor 31, the memory 32, and the storage 33. The electronic circuit 35 is a dedicated circuit that realizes the functions of the functional components, the memory 32, and the storage 33.

Figure 15:
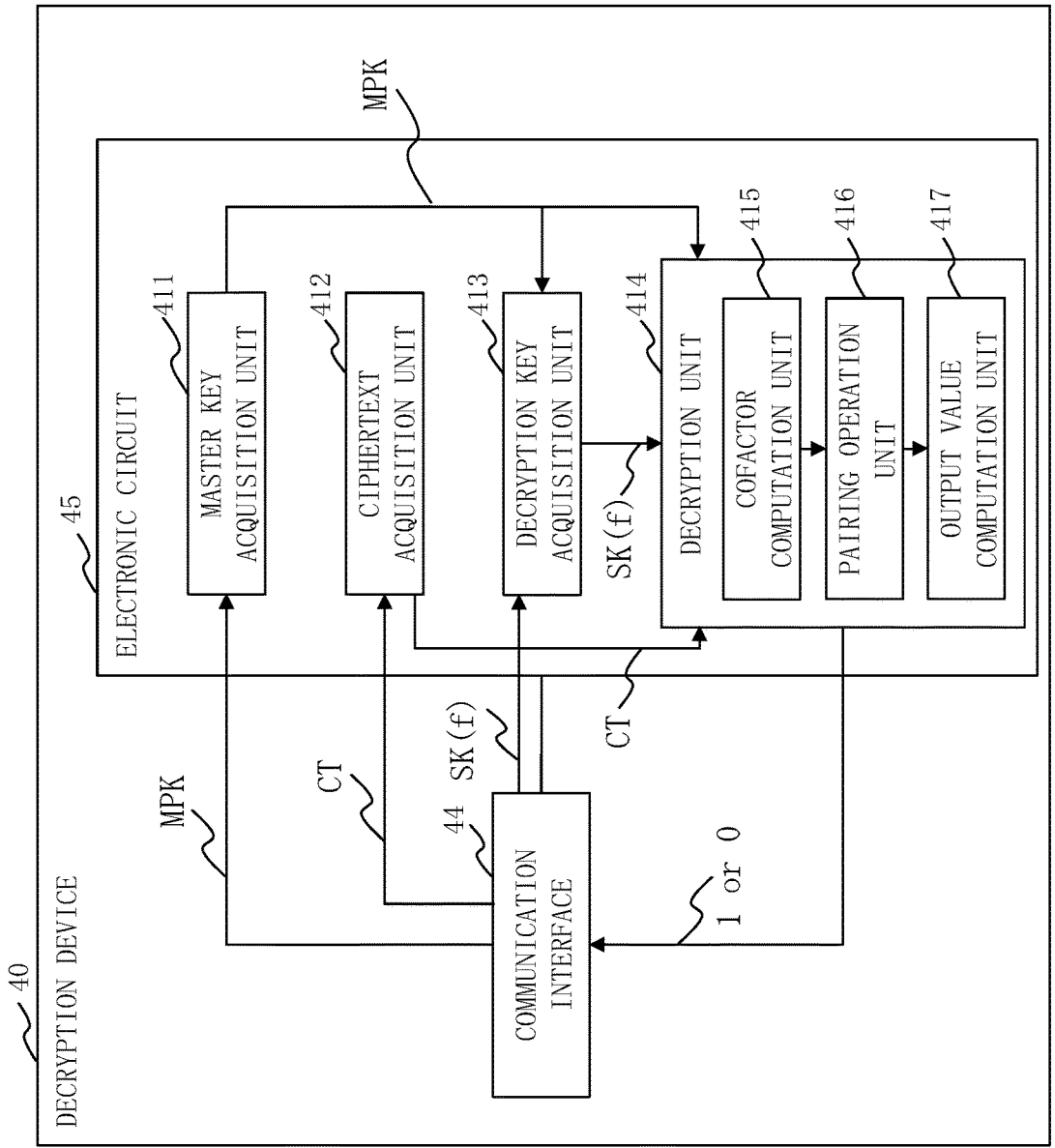
FIG. 15 is a configuration diagram of the decryption device 40 according to the third variation.

Referring to FIG. 15, a configuration of the decryption device 40 according to the third variation will be described.

When the functional components are realized by hardware, the decryption device 40 includes an electronic circuit 45 in place of the processor 41, the memory 42, and the storage 43. The electronic circuit 45 is a dedicated circuit that realizes the functions of the functional components, the memory 42, and the storage 43.

Each of the electronic circuits 15, 25, 35, and 45 is assumed to be a single circuit, a composite circuit, a programmed processor, a parallel-programmed processor, a logic IC, a gate array (GA), an application specific integrated circuit (ASIC), or a field-programmable gate array (FPGA).

The respective functional components may be realized by one electronic circuit 15, one electronic circuit 25, one electronic circuit 35, and one electronic circuit 45, or the respective functional components may be distributed among and realized by a plurality of electronic circuits 15, a plurality of electronic circuits 25, a plurality of electronic circuits 35, and a plurality of electronic circuits 45.

<Fourth Variation>

As a fourth variation, some of the functional components may be realized by hardware, and the rest of the functional components may be realized by software.

Each of the processors 11, 21, 31, 41, the memories 12, 22, 32, 42, the storages 13, 23, 33, 43, and the electronic circuits 15, 25, 35, 45 is referred to as processing circuitry. That is, the functions of the functional components are realized by the processing circuitry.

Second Embodiment

In a second embodiment, a Key-Encapsulation Mechanism (KEM) scheme converted from the PHPE scheme described in the first embodiment will be described. In the second embodiment, differences from the first embodiment will be described, and description of the same portions will be omitted.

*Description of Configurations*

<Construction of KEM Version PHPE>

In the second embodiment, a KEM version KP-PHPE scheme will be described.

The KEM version KP-PHPE scheme includes a PHPE.Setup algorithm, a PHPE.Encrypt algorithm, a PHPE.KeyGen algorithm, and a PHPE.Decrypt algorithm.

The PHPE.Setup algorithm takes as input a security parameter $\lambda$, a length n' of a public attribute vector, and a length n of a secret attribute vector, and outputs a public parameter MPK and a master secret key MSK.

The PHPE.Encrypt algorithm takes as input the public parameter MPK, a public attribute vector $\vec{x} \in F_q^{n'}$, and a secret attribute vector $\vec{z} \in F_q^n$, and outputs a ciphertext CT and a session key KEM.

The PHPE.KeyGen algorithm takes as input the public parameter MPK, the master secret key MSK, and a function $f \in F^{(q,n',n)}_{ABP \circ IP}$, and outputs a decryption key SK(f).

The PHPE.Decrypt algorithm takes as input the public parameter MPK, a pair of the function $f \in F^{(q,n',n)}_{ABP \circ IP}$ and the decryption key SK(f) for the function f, and a pair of the public attribute vector $\vec{x}$ and the ciphertext CT concerning the public attribute vector $\vec{x}$, and outputs a session key~.

*Description of Operation*

Referring to FIGS. 6 to 11, operation of the cryptographic system 1 according to the second embodiment will be described.

The operation of the cryptographic system 1 according to the second embodiment corresponds to a cryptographic method according to the second embodiment. The operation of the cryptographic system 1 according to the second embodiment also corresponds to processes of a cryptographic program according to the second embodiment.

Referring to FIG. 6, operation of the setup device 10 according to the second embodiment will be described.

The operation of the setup device 10 according to the second embodiment corresponds to a setup method according to the second embodiment. The operation of the setup device 10 according to the second embodiment also corresponds to processes of a setup program according to the second embodiment.

The processes of steps S11 and S14 are the same as those in the first embodiment.

(Step S12: Basis Generation Process)

The master key generation unit 112 generates params and orthonormal dual bases $\{B_\iota, B^*_\iota\}_{\iota \in [0,n'+n]}$, using as input the security parameter $\lambda$, the length n' of the public attribute vector, and the length n of the secret attribute vector accepted in step S11.

Specifically, the master key generation unit 112 generates params and the dual bases $\{B_\iota, B^*_\iota\}_{\iota \in [n'+n]}$ by executing the same algorithm $G_{OB}$ as that in the first embodiment, where N=n'+n+1, $d_0$=6, and $d_1, \ldots, d_N$=9. Differences from the first embodiment are N=n'+n+1 and $d_0$=6.

(Step S13: Master Key Generation Process)

The master key generation unit 112 generates a public parameter MPK and a master secret key MSK, using params and the dual bases $\{B_\iota, B^*_\iota\}_{\iota \in [0,n'+n]}$ generated in step S12.

Specifically, the master key generation unit 112 generates a partial basis $\hat{B}_0$ and a partial basis $\hat{B}^*_0$, as indicated in Formula 170, and generates a partial basis $\hat{B}_\iota$ and a partial basis $\hat{B}^*_\iota$, for each integer $\iota$ of $\iota \in [n'+n]$, as indicated in Formula 171.

$$\hat{\mathbb{B}}_0 = \{b^{(0,1)}, b^{(0,4)}, b^{(0,6)}\} \quad \hat{\mathbb{B}}^*_0 = \{b^{*(0,1)}, b^{*(0,4)}, b^{*(0,5)}\} \quad \text{[Formula 170]}$$

for $\iota \in [n'+n]$ $$\hat{\mathbb{B}}_\iota = \{b^{(\iota,1)}, b^{(\iota,2)}, b^{(\iota,9)}\} \quad \hat{\mathbb{B}}^*_\iota = \{b^{*(\iota,1)}, b^{*(\iota,2)}, b^{*(\iota,7)}, b^{*(\iota,8)}\} \quad \text{[Formula 171]}$$

The master key generation unit 112 sets params and the partial basis $\hat{B}_\iota$ for each integer $\iota$ of $\iota \in [0, n'+n]$ as the public parameter MPK. The master key generation unit 112 sets the partial basis $\hat{B}^*_\iota$ for each integer $\iota$ of $\iota \in [0, n'+n]$ as the master secret key MSK.

That is, the setup device 10 execute the PHPE.Setup algorithm indicated in Formula 172.

$$PHPE.\text{Setup}(1^{n'}, 1^n): \quad \text{[Formula 172]}$$

$$(params, \{\mathbb{B}_\iota, \mathbb{B}^*_\iota\}_{\iota \in [0,n'+n]}) \xleftarrow{R}$$

$$G_{OB}\left(n' + n + 1, \left(6, \overbrace{9, \ldots, 9}^{n'+n}\right)\right),$$

$$\hat{\mathbb{B}}_0 = \{b^{(0,1)}, b^{(0,4)}, b^{(0,6)}\}, \hat{\mathbb{B}}^*_0 = \{b^{*(0,1)}, b^{*(0,4)}, b^{*(0,5)}\}$$

for $\iota \in [n' + n]$ $$\hat{\mathbb{B}}_\iota = \{b^{(\iota,1)}, b^{(\iota,2)}, b^{(\iota,9)}\},$$

$$\hat{\mathbb{B}}^*_\iota = \{b^{*(\iota,1)}, b^{*(\iota,2)}, b^{*(\iota,7)}, b^{*(\iota,8)}\},$$

output $MPK = (params, \{\hat{\mathbb{B}}_\iota\}_{\iota \in [0,n'+n]})$, $MSK = \{\hat{\mathbb{B}}^*_\iota\}_{\iota \in [0,n'+n]}$.

Figure 7:
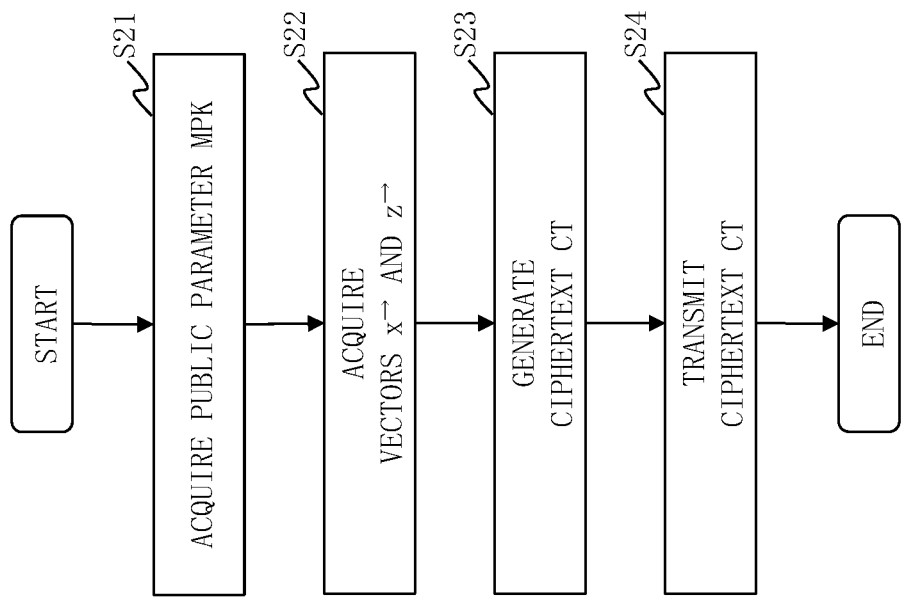
FIG. 7 is a flowchart illustrating operation of the encryption device 20 according to the first embodiment.

Referring to FIG. 7, operation of the encryption device 20 according to the second embodiment will be described.

The operation of the encryption device 20 according to the second embodiment corresponds to an encryption method according to the second embodiment. The operation of the encryption device 20 according to the second embodiment also corresponds to processes of an encryption program according to the second embodiment.

The processes other than step S23 are the same as those in the first embodiment.

(Step S23: Encryption Process)

The encryption unit 213 generates a ciphertext CT, using the public parameter MPK acquired in step S21 as well as the public attribute vector $\vec{x}$ and the secret attribute vector $\vec{z}$ acquired in step S22.

Specifically, the encryption unit 213 generates the ciphertext CT as described below.

First, the encryption unit 213 samples values $\omega, \xi$, and $\varphi'_0$, as indicated in Formula 173.

$$\omega, \xi, \phi'_0 \xleftarrow{U} \mathbb{F}_q \quad \text{[Formula 173]}$$

Next, the encryption unit 213 generates an element $c'^{(0)}$, as indicated in Formula 174.

$$c'^{(0)} = (\omega, \vec{0}^2, \xi, 0, \phi'_0)_{\mathbb{B}_0} \quad \text{[Formula 174]}$$

The encryption unit 213 sets $g_T^\xi$ as a session key KEM. Furthermore, the encryption unit 213 generates an element $c'^{(\iota')}$ for each integer $\iota'$ of $\iota' \in [n']$ and generates an element $c^{(\iota)}$ for each integer $\iota$ of $\iota \in [n]$, as in the first embodiment.

Then, the encryption unit 213 sets the public attribute vector $\vec{x}$, the element $c'^{(0)}$, the element $c'^{(\iota')}$ for each integer $\iota'$ of $\iota'[n']$, and the element $c^{(\iota)}$ for each integer $\iota$ of $\iota \in [n]$ as the ciphertext CT.

That is, the encryption device 20 executes the PHPE.Encrypt algorithm indicated in Formula 175.

$$PHPE.\text{Encrypt}(MPK, (\vec{x}, \vec{z})): \quad \text{[Formula 175]}$$

$$\omega, \xi, \phi'_0 \xleftarrow{U} \mathbb{F}_q,$$

$$c'^{(0)} = \left(\omega, \vec{0}^2, \xi, 0, \phi'_0\right)_{\mathbb{B}_0}, KEM = g_T^\xi,$$

for $\iota' \in [n']$ $$\phi'_{\iota'} \xleftarrow{U} \mathbb{F}_q, c'^{(\iota')} = \left(\omega(1, x_{\iota'}), \vec{0}^4, \vec{0}^2, \phi'_{\iota'}\right)_{\mathbb{B}_{\iota'}},$$

for $\iota \in [n]$ $$\phi_\iota \xleftarrow{U} \mathbb{F}_q, c^{(\iota)} = \left(\omega(1, z_\iota), \vec{0}^4, \vec{0}^2, \phi_\iota\right)_{\mathbb{B}_{n'+\iota}},$$

output $CT = \left(x, \{c'^{(\iota')}\}_{\iota' \in [0,n']}, \{c^{(\iota)}\}_{\iota \in [n]}\right)$.

Referring to FIG. 8, operation of the key generation device 30 according to the second embodiment will be described.

The operation of the key generation device 30 according to the second embodiment corresponds to a key generation method according to the second embodiment. The operation of the key generation device 30 according to the second embodiment also corresponds to processes of a key generation program according to the second embodiment.

The processes other than step S34 are the same as those in the first embodiment.

(Step S34: Key Generation Process)

The key generation unit 314 generates a decryption key SK(f), using the public parameter MPK and the master secret key MSK acquired in step S31, the function f acquired in step S32, and the set of constants ($\{\sigma_j\}_{j\in[n]}$, $\{\alpha_{j'},\gamma_{j'}\}_{j'\in[m]}$) generated in step S33.

Specifically, the key generation unit 314 generates the decryption key SK(f) as described below.

First, the key generation unit 314 samples values $r_0$, $\kappa'_0$, and $\zeta$, as indicated in Formula 176.

$$r_0, \kappa'_0, \zeta \xleftarrow{U} \mathbb{F}_q \qquad \text{[Formula 176]}$$

Next, the key generation unit 314 generates an element $k'^{(0)}$, as indicated in Formula 177.

$$k'^{(0)} = (-r_0, \vec{0}^2, 1, \kappa'_0, 0)_{\mathbb{B}^*_0} \qquad \text{[Formula 177]}$$

The key generation unit 314 generates an element $k'^{(j')}$ for each integer j' of $j' \in [m]$, as indicated in Formula 178, and generates an element $k^{(j)}$ for each integer j of $j \in [n]$, as indicated in Formula 179.

for $j' \in [m]$ [Formula 178]

$$\beta'_{j'} \xleftarrow{U} \mathbb{F}_q,$$

$$\vec{\kappa}'^{(j')} \xleftarrow{U} \mathbb{F}_q^2,$$

$$\gamma^+_{j'} = \gamma_{j'} + \beta'_{j'} r_0,$$

$$k'^{(j')} = \left((\gamma^+_{j'}, \alpha_{j'}), \vec{0}^4, \vec{\kappa}'^{(j')}, 0\right)_{\mathbb{B}^*_{\rho(j')}}$$

for $j \in [n]$ [Formula 179]

$$\beta_j \xleftarrow{U} \mathbb{F}_q,$$

$$\vec{\kappa}^{(j)} \xleftarrow{U} \mathbb{F}_q^2,$$

$$\sigma^+_j = \sigma_j + \beta_j r_0,$$

$$k^{(j)} = \left((\sigma^+_{j'}, \zeta), \vec{0}^4, \vec{\kappa}^{(j)}, 0\right)_{\mathbb{B}^*_{n'+j}}$$

Then, the key generation unit 314 sets the function f, the element $\beta'_{j'}$ for each integer j' of $j' \in [m]$, the element $\beta_j$ for each integer j of $j \in [n]$, the element $k'^{(0)}$, the element $k'^{(j')}$ for each integer j' of $j' \in [m]$, and the element $k^{(j)}$ for each integer j of $j \in [n]$ as the decryption key SK(f).

That is, the key generation device 30 executes the PHPE.KeyGen algorithm indicated in Formula 180.

PHPE.KeyGen(MPK, MSK, f) : [Formula 180]

$$\left(\left(\{\sigma_j\}_{j\in[n]}, \{\alpha_{j'}, \gamma_{j'}\}_{j'\in[m]}\right), \rho:[m]\to[n']\right) \xleftarrow{R} PGB(f),$$

$$r_0, \kappa'_0, \zeta \xleftarrow{U} \mathbb{F}_q,$$

$$k'^{(0)} = \left(-r_0, \vec{0}^2, 1, \kappa'_0, 0\right)_{\mathbb{B}^*_0},$$

for $j' \in [m]$ $$\beta'_{j'} \xleftarrow{U} \mathbb{F}_q, \vec{\kappa}'^{(j')} \xleftarrow{U} \mathbb{F}_q^2,$$

$$\gamma^+_{j'} = \gamma_{j'} + \beta'_{j'} r_0, k'^{(j')} = \left((\gamma^+_{j'}, \alpha_{j'}), \vec{0}^4, \vec{\kappa}'^{(j')}, 0\right)_{\mathbb{B}^*_{\rho(j')}}$$

for $j \in [n]$ $$\beta_j \xleftarrow{U} \mathbb{F}_q, \vec{\kappa}^{(j)} \xleftarrow{U} \mathbb{F}_q^2,$$

$$\sigma^+_j = \sigma_j + \beta_j r_0, k^{(j)} = \left((\sigma^+_j, \zeta), \vec{0}^4, \vec{\kappa}^{(j)}, 0\right)_{\mathbb{B}^*_{n'+j}},$$

output $SK(f) =$ $$\left(f, \{\beta'_{j'}\}_{j'\in[m]}, \{\beta_j\}_{j\in[n]}, \{k'^{(j')}\}_{j\in[0,m]}, \{k^{(j)}\}_{j\in[n]}\right).$$

Figure 10:
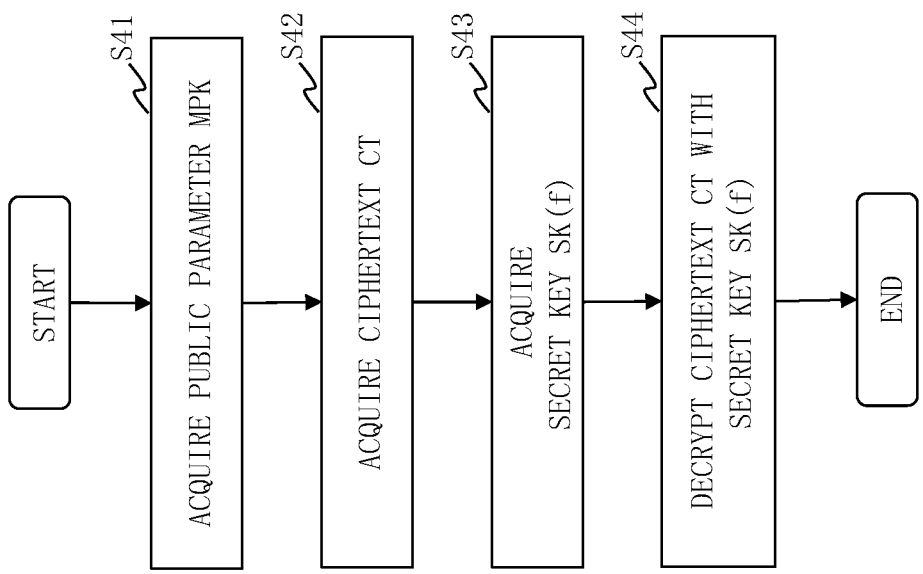
FIG. 10 is a flowchart illustrating operation of the decryption device 40 according to the first embodiment.

Referring to FIG. 10, operation of the decryption device 40 according to the second embodiment will be described.

The operation of the decryption device 40 according to the second embodiment corresponds to a decryption method according to the second embodiment. The operation of the decryption device 40 according to the second embodiment also corresponds to processes of a decryption program according to the second embodiment.

The processes other than step S44 are the same as those in the first embodiment.

(Step S44: Decryption Process)

The decryption unit 414 decrypts the ciphertext CT by performing a pairing operation on the ciphertext CT acquired in step S42 and the decryption key SK(f) acquired in step S43.

Referring to FIG. 11, a decryption process according to the second embodiment will be described.

The process of step S441 is the same as that in the first embodiment.

(Step S442: Pairing Operation Process)

The pairing operation unit 416 performs a pairing operation on the element $c'^{(0)}$ and the element $k'^{(0)}$ to compute an operation value $\Lambda'_0$, as indicated in Formula 181.

$$\Lambda'_0 = e(c'^{(0)}, k'^{(0)}) \qquad \text{[Formula 181]}$$

The pairing operation unit 416 computes an operation value $\Lambda'_{j'}$ for each integer j' of $j' \in [m]$ and computes an operation value $\Lambda_j$ for each integer j of $j \in [n]$, as in the first embodiment.

The pairing operation unit 416 writes the operation value $\Lambda'_0$, the operation value $\Lambda'_{j'}$, and the operation value $\Lambda_j$ in the memory 42.

(Step S443: Output Value Computation Process)

The output value computation unit 417 retrieves the set of coefficients $((\{\Omega_j\}_{j\in[n]}, \{\Omega'_{j'}\}_{j'\in[m]})$ computed in step S441 as well as the operation value $\Lambda'_0$, the operation value $\Lambda'_{j'}$, and the operation value $\Lambda_j$ computed in step S442 from the memory 42. The output value computation unit 417 computes an operation value $\Lambda$, as indicated in Formula 182.

$$\Lambda = \left(\prod_{j'\in[m]} \Lambda'^{\Omega'_{j'}}_{j'}\right)\left(\prod_{j\in[n]} \Lambda^{\Omega_j}_j\right)^{\frac{1}{\Sigma_{j'\in[m]}\Omega'_{j'}\beta'_{j'} + \Sigma_{j\in[n]}\Omega_j\beta_j}} \qquad \text{[Formula 182]}$$

The output value computation unit 417 computes a session key KEM~, as indicated in Formula 183.

$$KEM^\sim = \Lambda\Lambda'_0 \qquad \text{[Formula 183]}$$

That is, the decryption device 40 executes the PHPE.Decrypt algorithm indicated in Formula 184.

PHPE.Decrypt(MPK, SK(f), CT) : [Formula 184]

$$\left(\{\Omega_j\}_{j\in[n]}, \{\Omega'_{j'}\}_{j'\in[m]}\right) = REC(f, \vec{x}),$$

$$\Lambda'_0 = e(c'^{(0)}, k'^{(0)}),$$

$$\Lambda'_{j'} = e(c'(\rho(j')), k'^{(j')}) \text{ for } j' \in [m],$$

$$\Lambda_j = e(c^{(j)}, k^{(j)}) \text{ for } j \in [n],$$

$$\Lambda = \left(\prod_{j'\in[m]} \Lambda'^{\Omega'_{j'}}_{j'}\right)\left(\prod_{j\in[n]} \Lambda^{\Omega_j}_j\right)^{\frac{1}{\Sigma_{j'\in[m]}\Omega'_{j'}\beta'_{j'} + \Sigma_{j\in[n]}\Omega_j\beta_j}},$$

output $KEM^\sim = \Lambda\Lambda'_0$.

The operation value $\Lambda'_0$, the operation value $\Lambda'_{j'}$, and the operation value $\Lambda_j$ are as indicated in Formula 185.

$$\Lambda'_0 = g_T^{-\omega r_0 + \xi},$$

$$\Lambda'_{j'} = g_T^{\omega(\alpha_{j'} x_{\rho(j')} + \gamma_{j'} + \beta'_{j'} r_0)} \text{ for } j' \in [m],$$

$$\Lambda_j = g_T^{\omega(\zeta z_j + \sigma_j + \beta_j r_0)} \text{ for } j \in [n] \qquad \text{[Formula 185]}$$

The operation value $\Lambda$ is as indicated in Formula 186.

$$\Lambda = g_T^{[\omega \zeta f(\vec{x},\vec{z})] + \omega r_0 [\Sigma_{j' \in [m]} \Omega_{j'} \beta'_{j'} + \Sigma_{j \in [n]} \Omega_j \beta_j] 1] / [\Sigma_{j' \in [m]} \Omega_{j'} \beta'_{j'} + \Sigma_{j \in [n]} \Omega_j \beta_j]} \qquad \text{[Formula 186]}$$

Therefore, if $R^{ABP \circ IP}(f,(\vec{x},\vec{z})) = 1$, that is, $f(\vec{x},\vec{z}) = 0$, then Formula 187 holds.

$$\Lambda = g_T^{\omega r_0} \qquad \text{[Formula 187]}$$

Therefore, $\widetilde{\text{KEM}} = g_T^{\xi} = \text{KEM}$. Note that if $R^{ABP \circ IP}(f,(\vec{x},\vec{z})) \neq 1$, that is, $f(\vec{x},\vec{z}) \neq 0$, then Formula 187 does not hold and thus $\widetilde{\text{KEM}} \neq g_T^{\xi} = \text{KEM}$.

\*\*\*Effects of Second Embodiment\*\*\*

As described above, the cryptographic system 1 according to the second embodiment realizes a KEM scheme by converting the PHPE scheme described in the first embodiment. This makes it possible to realize a KEM scheme that allows a wide range of predicates and also allows security to be enhanced.

\*\*\*Other Configurations\*\*\*

<Fifth Variation>

In the second embodiment, the KEM scheme is constructed by converting the KP-PHPE method. By applying similar modifications, a KEM scheme can also be constructed by converting the CP-PHPE scheme described in the first variation.

<Sixth Variation>

By using the indexing technique as described in the second variation, the KEM scheme described in the second embodiment can also be realized using only one pair of dual bases, the basis B and the basis B\*.

REFERENCE SIGNS LIST

1: cryptographic system, 10: setup device, 11: processor, 12: memory, 13: storage, 14: communication interface, 15: electronic circuit, 111: acceptance unit, 112: master key generation unit, 113: transmission unit, 20: encryption device, 21: processor, 22: memory, 23: storage, 24: communication interface, 25: electronic circuit, 211: master key acquisition unit, 212: vector acquisition unit, 213: encryption unit, 214: transmission unit, 30: key generation device, 31: processor, 32: memory, 33: storage, 34: communication interface, 35: electronic circuit, 311: master key acquisition unit, 312: function acquisition unit, 313: PGB computation unit, 314: key generation unit, 315: transmission unit, 40: decryption device, 41: processor, 42: memory, 43: storage, 44: communication interface, 45: electronic circuit, 411: master key acquisition unit, 412: ciphertext acquisition unit, 413: decryption key acquisition unit, 414: decryption unit, 415: cofactor computation unit, 416: pairing operation unit, 417: output value computation unit

The invention claimed is:

1. A decryption device comprising:
processing circuitry to:
acquire a ciphertext in which one of a predicate vector of arithmetic branching programs (ABP) and an attribute vector is set over a basis B, wherein the basis B and a basis B\* are dual bases in dual vector spaces, which are generated based on a length (n') of a public attribute vector and a length (n) of a secret attribute vector such that each of the basis B and the basis B\* consists of L partial bases, wherein L is an integer equal to n'+n, each of n' and n is an integer greater than or equal to 1, and the public attribute vector is published,
acquire a decryption key in which the other one of the predicate vector and the attribute vector is set over the basis B\*, and
decrypt the ciphertext by performing a pairing operation on the acquired ciphertext and the acquired decryption key.

2. The decryption device according to claim 1,
wherein elements of the predicate vector are elements obtained by a product of a matrix representation L that represents an ABP computing a function f and a matrix whose elements in a last row are 1's.

3. The decryption device according to claim 2,
wherein the processing circuitry computes cofactors of elements in a last column of the matrix representation L,
computes an operation value by performing a pairing operation on the ciphertext and the decryption key, and
computes an output value obtained by decrypting the ciphertext, using the computed cofactors and the computed operation value.

4. The decryption device according to claim 3,
wherein the processing circuitry computes a value resulting from inputting the attribute vector to the function f, using an inner-product and the cofactors, and computes the output value based on the computed value.

5. The decryption device according to claim 4,
wherein the processing circuitry acquires a ciphertext CT indicated in Formula 1,
acquires a decryption key SK(f) indicated in Formula 2,
computes the operation values $\Lambda'_j$ and $\Lambda_j$ by performing a pairing operation as indicated in Formula 3,
computes a value $\Lambda$ as indicated in Formula 4, and
computes an output value depending on a value of the value $\Lambda$ $$CT = \left(\vec{x}, \{c'^{(\iota')}\}_{\iota' \in [n']}, \{c^{(\iota)}\}_{\iota \in [n]}\right) \qquad \text{[Formula 1]}$$

$$\omega \xleftarrow{U} \mathbb{F}_q,$$

for $\iota' \in [n']$ $$\phi'_{\iota'} \xleftarrow{U} \mathbb{F}_q, c'^{(\iota')} = \left(\omega(1, x_{\iota'}), \vec{0}^4, \vec{0}^2, \phi'_{\iota'}\right)_{\mathbb{B}_{\iota'}},$$

for $\iota \in [n]$ $$\phi_\iota \xleftarrow{U} \mathbb{F}_q, c^{(\iota)} = \left(\omega(1, z_\iota), \vec{0}^4, \vec{0}^2, \phi_\iota\right)_{\mathbb{B}_{n'+\iota}},$$

where $n', n \in \mathbb{N}$, $(\vec{x}, \vec{z}) \in \mathbb{F}_q^{n'} \times \mathbb{F}_q^n$ are attribute vectors, $$SK(f) = \left(f, \{k'^{(j')}\}_{j' \in [m]}, \{k^{(j)}\}_{j \in [n]}\right), \qquad \text{[Formula 2]}$$

$$\left(\{\sigma_j\}_{j \in [n]}, \{\alpha_{j'}, \gamma_{j'}\}_{j' \in [m]}\right), \rho:[m] \to [n'] \xleftarrow{R} PGB(f),$$

$$\varsigma \xleftarrow{U} \mathbb{F}_q,$$

for $j' \in [m]$ $$\vec{k}'^{(j')} \xleftarrow{U} \mathbb{F}_q^2, k'(j') = \left((\gamma_{j'}, \alpha_{j'}), \vec{0}^4, \vec{k}'^{(j')}, 0\right)_{\mathbb{B}^*_{\rho(j')}},$$

for $j \in [n]$ $$\vec{k}^{(j)} \xleftarrow{U} \mathbb{F}_q^2, k(j) = \left((\sigma_j, \varsigma), \vec{0}^4, \vec{k}^{(j)}, 0\right)_{\mathbb{B}^*_{n'+1}}$$

where

PGB(f) is an algorithm that takes as input a function f, and outputs a set of constants $(\{\sigma_j\}_{j\in[n]}, \{\alpha_{j'},\gamma_{j'}\}_{j'\in[m]}) \in F_q^n \times (F_q^2)^m$, which are elements of a predicate vector, along with a function $\rho: [m] \to [n']$, $$\Lambda'_{j'} = e(c'^{(\rho(j'))}, k'^{(j')}) \text{ for } j' \in [m],$$

$$\Lambda_j = e(c^{(j)}, k^{(j)}) \text{ for } j \in [n] \quad\quad \text{[Formula 3]}$$

$$\Lambda = \left(\prod_{j' \in [m]} \Lambda'^{\Omega'_{j'}}_{j'}\right)\left(\prod_{j \in [n]} \Lambda^{\Omega_j}_j\right), \quad\quad \text{[Formula 4]}$$

$$\left(\{\Omega_j\}_{j\in[n]}, \{\Omega'_{j'}\}_{j'\in[m]}\right) = REC(f, \vec{x}),$$

where $REC(f, \vec{x})$ is an algorithm that takes as input a function f and $\vec{x} \in F_q^n$, and outputs a set of coefficients $(\{\Omega_j\}_{j\in[n]}, \{\Omega'_{j'}\}_{j'\in[m]}) \in F_q^{n+m}$.

6. The decryption device according to claim 4, wherein the processing circuitry acquires a ciphertext CT indicated in Formula 5, acquires a decryption key SK(f) indicated in Formula 6, computes the operation values $\Lambda'_0, \Lambda'_{j'}$, and $\Lambda_j$ by performing a pairing operation as indicated in Formula 7, computes a value $\Lambda$ as indicated in Formula 8, and computes a value $\Lambda\Lambda'_0$ as the output value $$CT = \left(\vec{x}, \{c'^{(\iota')}\}_{\iota' \in [0,n']}, \{c^{(\iota)}\}_{\iota \in [n]}\right), \quad\quad \text{[Formula 5]}$$

$$\omega, \xi, \phi'_0 \xleftarrow{U} F_q,$$

$$c'^{(0)} = \left(\omega, \vec{0}^2, \xi, 0, \phi'_0\right)_{B_0},$$

for $\iota' \in [n']$ $$\phi'_{\iota'} \xleftarrow{U} F_q, c'^{(\iota')} = \left(\omega(1, x_{\iota'}), \vec{0}^4, \vec{0}^2, \phi'_{\iota'}\right)_{B_{\iota'}},$$

for $\iota \in [n]$ $$\phi_\iota \xleftarrow{U} F_q, c^{(\iota)} = \left(\omega(1, z_\iota), \vec{0}^4, \vec{0}^2, \phi_\iota\right)_{B_{n'+\iota}},$$

where n', n∈ℕ, $(\vec{x}, \vec{z}) \in F_q^{n'} \times F_q^n$ are attribute vectors, $$SK(f) = \left(f, \{\beta'_{j'}\}_{j'\in[m]}, \{\beta_j\}_{j\in[n]}, \{k'^{(j')}\}_{j'\in[0,m]}, \{k^{(j)}\}_{j\in[n]}\right), \quad\quad \text{[Formula 6]}$$

$$\left(\left(\{\sigma_j\}_{j\in[n]}, \{\alpha_{j'}, \gamma_{j'}\}_{j'\in[m]}\right), \rho:[m] \to [n']\right) \xleftarrow{R} PGB(f),$$

$$r_0, \kappa'_0, \varsigma \xleftarrow{U} F_q,$$

$$k'^{(0)} = \left(-r_0, \vec{0}^2, 1, \kappa'_0, 0\right)_{B^*_0},$$

for $j' \in [m]$ $$\beta'_{j'} \xleftarrow{U} F_q, \vec{\kappa}^{(j')} \xleftarrow{U} F_q^2,$$

$$\gamma^+_{j'} = \gamma_{j'} + \beta'_{j'} r_0, k'^{(j')} = \left((\gamma^+_{j'}, \alpha_{j'}), \vec{0}^4, \vec{\kappa}'(j'), 0\right)_{B^*_{\rho(j')}},$$

for $j \in [n]$ $$\beta_j \xleftarrow{U} F_q, \vec{\kappa}^{(j)} \xleftarrow{U} F_q^2,$$

$$\sigma^+_j = \sigma_j + \beta_j r_0 k(j) = \left((\sigma^+_j, \varsigma), \vec{0}4, \vec{\kappa}^{(j)}, 0\right)_{B^*_{n'+j}},$$

where

PGB(f) is an algorithm that takes as input a function f, and outputs a set of constants $(\{\sigma_j\}_{j\in[n]}, \{\alpha_{j'},\gamma_{j'}\}_{j'\in[m]}) \in F_q^n \times (F_q^2)^m$, which are elements of a predicate vector, along with a function $\rho:[m]\to[n]$, $$\Lambda'_0 = e(c'^{(0)}, k'^{(0)}),$$

$$\Lambda'_{j'} = e(c'^{(\rho(j'))}, k'^{(j')}) \text{ for } j' \in [m],$$

$$\Lambda_j = e(c^{(j)}, k^{(j)}) \text{ for } j \in [n] \quad\quad \text{[Formula 7]}$$

$$\Lambda = \left(\prod_{j'\in[m]} \Lambda'^{\Omega'_{j'}}_{j'}\right)\left(\prod_{j\in[n]} \Lambda^{\Omega_j}_j\right)^{\frac{1}{\sum_{j'\in[m]}\Omega'_{j'}\beta'_{j'} + \sum_{j\in[n]}\Omega_j\beta_j}}, \quad\quad \text{[Formula 8]}$$

$$\left(\{\Omega_j\}_{j\in[n]}, \{\Omega'_{j'}\}_{j'\in[m]}\right) = REC(f, \vec{x}),$$

where $REC(f, \vec{x})$ is an algorithm that takes as input a function f and $\vec{x} \in F_q^n$, and outputs a set of coefficients $(\{\Omega_j\}_{j\in[n]}, \{\Omega'_{j'}\}_{j'\in[m]}) \in F_q^{n+m'}$.

7. A cryptographic system comprising:
an encryption device to generate a ciphertext by setting, in the ciphertext, one of a predicate vector of arithmetic branching programs (ABP) and an attribute vector over a basis B, wherein the basis B and a basis B* are dual bases in dual vector spaces, which are generated based on a length (n') of a public attribute vector and a length (n) of a secret attribute vector such that each of the basis B and the basis B* consists of L partial bases, wherein L is an integer equal to n'+n, each of n' and n is an integer greater than or equal to 1, and the public attribute vector is published;

a key generation device to generate a decryption key by setting, in the decryption key, the other one of the predicate vector and the attribute vector over the basis B*; and a decryption device to decrypt the ciphertext by performing a pairing operation on the ciphertext generated by the encryption device and the decryption key generated by the key generation device.

8. A decryption method comprising:
acquiring a ciphertext in which one of a predicate vector of arithmetic branching programs (ABP) and an attribute vector is set over a basis B, wherein the basis B and a basis B* are dual bases in dual vector spaces, which are generated based on a length (n') of a public attribute vector and a length (n) of a secret attribute vector such that each of the basis B and the basis B* consists of L partial bases, wherein L is an integer equal to n'+n, each of n' and n is an integer greater than or equal to 1, and the public attribute vector is published;

acquiring a decryption key in which the other one of the predicate vector and the attribute vector is set over the basis B*; and decrypting the ciphertext by performing a pairing operation on the acquired ciphertext and the acquired decryption key.

* * * * *